United States Patent
Bharathan et al.

(10) Patent No.: US 11,093,078 B1
(45) Date of Patent: Aug. 17, 2021

(54) ALWAYS ON LOW POWER CAPACITIVE MATRIX AUTONOMOUS SCAN

(71) Applicant: Cypress Semiconductor Corporation, San Jose, CA (US)

(72) Inventors: Vibheesh Bharathan, San Jose, CA (US); Andrew Kinane, C15 X2W9 (IE)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 16/824,972

(22) Filed: Mar. 20, 2020

(51) Int. Cl.
*G06F 3/041* (2006.01)
*G06F 3/044* (2006.01)

(52) U.S. Cl.
CPC .......... *G06F 3/04166* (2019.05); *G06F 3/044* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,375,535 B1* | 5/2008 | Kutz | ......................... | G01D 5/24 324/658 |
| 8,065,544 B2* | 11/2011 | Smit | ...................... | G06F 1/3259 713/323 |
| 8,094,128 B2* | 1/2012 | Vu | ........................ | G06F 3/0446 345/173 |
| 8,310,472 B2* | 11/2012 | Vu | ........................ | G06F 3/0416 345/204 |
| 8,390,588 B2* | 3/2013 | Vu | ......................... | G06F 1/3262 345/173 |
| 8,471,837 B2* | 6/2013 | Vu | ....................... | G06F 3/04166 345/204 |
| 8,510,481 B2 | 8/2013 | Wilson et al. | | |
| 8,669,960 B2 | 3/2014 | Murphy et al. | | |
| 8,797,049 B2 | 8/2014 | Pedersen et al. | | |
| 8,836,656 B2* | 9/2014 | Vu | .......................... | G06F 3/044 345/173 |
| 9,019,230 B2 | 4/2015 | Li et al. | | |

(Continued)

OTHER PUBLICATIONS

"Capacitive touch and host controller functionality all in one package can reduce costs, design time and board space" dated Jan. 31, 2020; 7 pages.

(Continued)

*Primary Examiner* — Amy Onyekaba

(57) ABSTRACT

Disclosed are sensing systems and methods that eliminate CPU intervention or interrupts when performing sensor scans of a touch interface, supports low power sensing operation without requiring periodic wake up of the CPU, and is scalable to multi-channel or multi-chip sensor configuration to support large touch screens or a high number of sensors. A sensor scanning module may operate in a chained-scan using direct memory access (CS-DMA) mode or an autonomous scan-multiple scan (AS-MS) mode to perform scanning of all sensors within a frame without requiring CPU intervention or generating CPU interrupts after every scan in the frame. The sensor scanning module may operate autonomously in a low-power always-on scan (LP-AOS) mode for multiple frames without CPU interaction until a touch event is detected. The CPU may operate in a low power sleep mode during the scan while providing consistent refresh rate and low touch-to-system wake up latency.

20 Claims, 19 Drawing Sheets

(56) References Cited

U.S. PATENT DOCUMENTS

| | | | | |
|---|---|---|---|---|
| 9,058,079 B1* | 6/2015 | Schneider | | H04B 5/0031 |
| 9,063,601 B2* | 6/2015 | Vu | | G06F 3/04166 |
| 9,110,543 B1* | 8/2015 | Dabell | | G06F 3/0442 |
| 9,383,843 B2* | 7/2016 | Krah | | G06F 3/04166 |
| 10,025,412 B2* | 7/2018 | Shepelev | | G06F 3/0412 |
| 10,031,609 B2* | 7/2018 | Vu | | G06F 3/044 |
| 10,120,499 B2 | 11/2018 | Cheng | | |
| 10,664,095 B2* | 5/2020 | Vu | | G06F 3/0416 |
| 2008/0158177 A1* | 7/2008 | Wilson | | G06F 3/04166 |
| | | | | 345/173 |
| 2008/0162996 A1* | 7/2008 | Krah | | G06F 3/0418 |
| | | | | 714/27 |
| 2008/0162997 A1* | 7/2008 | Vu | | G06F 3/0445 |
| | | | | 714/27 |
| 2010/0060590 A1* | 3/2010 | Wilson | | G06F 3/04166 |
| | | | | 345/173 |
| 2010/0173680 A1* | 7/2010 | Vu | | G06F 3/03545 |
| | | | | 455/566 |
| 2010/0188356 A1* | 7/2010 | Vu | | G06F 3/041 |
| | | | | 345/173 |
| 2011/0061947 A1* | 3/2011 | Krah | | G06F 1/3262 |
| | | | | 178/18.01 |
| 2011/0063993 A1* | 3/2011 | Wilson | | H04M 11/062 |
| | | | | 370/254 |
| 2011/0080367 A1* | 4/2011 | Marchand | | G06F 1/3215 |
| | | | | 345/174 |
| 2012/0054379 A1* | 3/2012 | Leung | | G06F 1/3275 |
| | | | | 710/23 |
| 2012/0098778 A1* | 4/2012 | Vu | | G06F 3/044 |
| | | | | 345/173 |
| 2013/0176273 A1* | 7/2013 | Li | | G06F 1/3262 |
| | | | | 345/174 |
| 2013/0261814 A1* | 10/2013 | Shrall | | G06F 1/206 |
| | | | | 700/286 |
| 2014/0340345 A1* | 11/2014 | Vu | | G06F 3/0445 |
| | | | | 345/173 |
| 2015/0091859 A1* | 4/2015 | Rosenberg | | G06F 3/0445 |
| | | | | 345/174 |
| 2015/0097583 A1* | 4/2015 | Gao | | G01R 15/002 |
| | | | | 324/679 |
| 2015/0268791 A1* | 9/2015 | Vu | | G06F 3/0445 |
| | | | | 345/174 |
| 2016/0086404 A1* | 3/2016 | Parthasarathy | | G06F 21/6245 |
| | | | | 340/5.28 |
| 2016/0162011 A1* | 6/2016 | Verma | | G06F 3/041661 |
| | | | | 345/173 |
| 2016/0246396 A1* | 8/2016 | Dickinson | | G06F 3/03545 |
| 2016/0266679 A1* | 9/2016 | Shahparnia | | G06F 3/044 |
| 2016/0370915 A1* | 12/2016 | Agarwal | | G06F 3/0443 |
| 2018/0025199 A1* | 1/2018 | Ryshtun | | G06K 9/001 |
| | | | | 382/125 |
| 2018/0088733 A1* | 3/2018 | Syed | | G06F 1/3262 |
| 2018/0218195 A1* | 8/2018 | Sheik-Nainar | | G06K 9/001 |
| 2018/0321791 A1* | 11/2018 | Vu | | G06F 3/044 |
| 2018/0330694 A1* | 11/2018 | Klein | | G06F 1/1618 |
| 2019/0080135 A1* | 3/2019 | Shen | | G06K 9/00053 |
| 2019/0181860 A1* | 6/2019 | Cholasta | | H03K 17/9622 |
| 2020/0133455 A1* | 4/2020 | Sepehr | | G06F 3/0412 |
| 2020/0272301 A1* | 8/2020 | Duewer | | H04J 3/0635 |
| 2020/0348745 A1* | 11/2020 | Hamlin | | G06F 3/017 |
| 2020/0348793 A1* | 11/2020 | Vu | | G06F 3/0446 |

OTHER PUBLICATIONS

"Capacitive Touch Tests MCU Flexibility" Digi-Key, dated Jan. 31, 2020; 5 pages.

* cited by examiner

ALWAYS ON LOW POWER CAPACITIVE MATRIX AUTONOMOUS SCAN

TECHNICAL FIELD

The subject technology generally relates to sensor technology, and more particularly, to methods and systems for low power scan of sensors such as capacitive, inductive, magnetic, current, voltage sensors used in touch screens or other sensing applications.

BACKGROUND

Highly integrated electronic circuits that integrate touch sensing interface, wireless connectivity, audio processing, and multimedia display are used in a wide variety of applications. The touch sensing interface may be a slider, touchpad, or a touch screen that employs a matrix of capacitive sensors. To detect user interface through the touch sensing interface, CPU interaction may be needed to scan the matrix of capacitive sensors, referred to as a frame of scan. For example, the CPU may perform interconnection of electrodes and configure sensor parameters such as block configuration, course and fine initialization, scanning resolution, etc., before commanding the sensors to initiate the scan. Each of the sensors may successively perform the scan for the frame. When a sensor completes its scan, the sensor may generate an interrupt for the CPU to read and convert the results of the scan and for the CPU to configure and command the next sensor in the frame. At the end of the frame, the CPU may process the scanned results to detect the user input. The scanning of the frame of sensors may repeat with a period. The repetitive interrupt handling and configurations of each sensor in the frame requires significant CPU bandwidth, degrading the system performance of the electronic circuit that also performs other functions such as wireless communication, audio processing, graphics display, etc. Solutions to reduce the CPU interaction for servicing touch sensing interface may include using dedicated hardware. However, dedicated hardware increases die area, power, and cost.

In other applications, the touch sensors may be used in low power applications such as in battery powered devices. To conserve power at the system level, the device may be put in a sleep mode. However, to perform a scan, device resources external to the touch sensors such as the CPU, bus access, and IO interconnections may need to be in the active power domain. The device may operate a periodic scan in which the CPU is put into a sleep mode and periodically wakes up to monitor user interaction in an active mode. The need for the device to periodically wake up limits the extent of power optimization. To reduce the average power consumption, the interval for the sleep mode may be lengthened, which adversely results in longer touch to system detection latency and reduced display refresh rate. Solutions to satisfy low power applications without performance degradation may include using dedicated hardware, but these solutions may be restricted in the type of sensors used, may not be scalable, and may have limited capacitance range. It is desirable for sensor scanning solutions in highly integrated devices that reduce the CPU bandwidth needed to support scanning a frame, conserve device power, while providing the flexibility to fine tune performance.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Examples of various aspects and variations of the subject technology are described herein and illustrated in the accompanying drawings. The following description is not intended to limit the invention to these embodiments, but rather to enable a person skilled in the art to make and use this invention. For example, while examples, implementations, and embodiments of the subject technology are described using capacitive sensors of a touch screen panel, the subject technology is not thus limited and may be applicable to other types of sensor technologies or sensor applications using other types of sensors such as inductive, magnetic, current, voltage sensors.

In multi-functional devices with touch sensing capability, the touch sensing interface may include a matrix of capacitive sensors arrayed on a surface such as a touch pad or touch screen. To detect user interaction on the touch sensing interface, a device may scan the sensors to obtain sampled values for a specific sensor configuration. Typically, the device may scan a frame of sensor over multiple sensor configurations by moving from sensor to sensor over multiple scans. Existing solutions require significant interaction by a CPU of the device to support a frame of sensor scan, leading to consumption of CPU bandwidth that may otherwise be utilized to implement other functions of the device, resulting in degraded system performance and increased power consumption.

Figure 1:
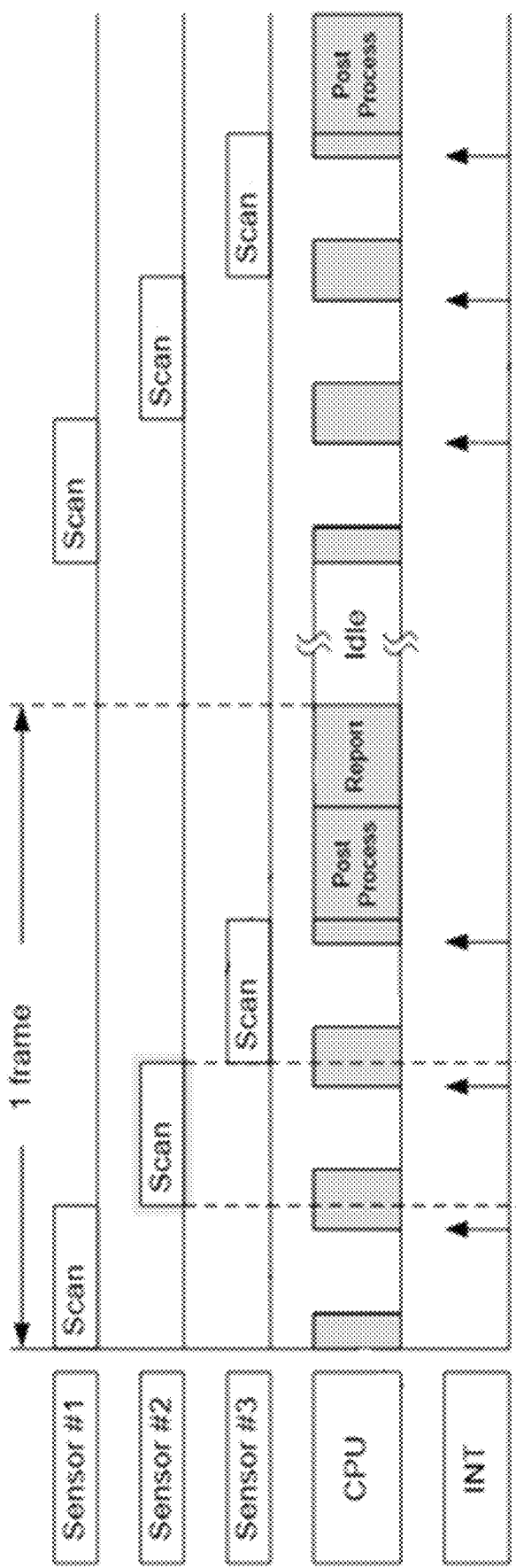
FIG. 1 illustrates a timeline of an existing solution for sensors to perform a frame of scan that generates an interrupt and requires CPU interaction for each scan.

FIG. 1 illustrates a timeline of an existing solution for sensors to perform a frame of scan that generates an interrupt and requires CPU interaction for each scan. The frame of scan encompasses three scans, one for each of the three sensors. To perform the scan by the first sensor, the CPU may load the first sensor with its sensor configuration such as coarse and fine initialization parameters. The CPU may command the first sensor to perform the scan using the loaded configuration. When the first sensor completes its scan, the first sensor may generate an interrupt for the CPU to read and convert the scanned data. The CPU may load the second sensor with its sensor configuration, command the second sensor to perform the scan using the loaded configuration, receive a scan completion interrupt from the second sensor, execute an interrupt service routine to read and convert the scanned data, and repeat the operations for successive sensor until the frame of scan is completed. At the end of the frame, the CPU may post process the scanned data from the sensors in the frame to detect user interaction. In addition, the CPU may perform operations such as interconnection of electrodes and block configurations of the sensors in the frame. The CPU may repeat the frame of sensor scan with a period as determined by the refresh rate of the touch screen. Because each sensor scan in the frame generates an interrupt, which may be as often as every 100 µsec, and requires CPU intervention, the scan operations incur significant CPU overhead.

Disclosed are systems and methods that eliminate CPU intervention, interrupts and CPU overhead when performing scans for a frame, supports low power sensing operation without requiring periodic wake up of the rest of the device including the CPU, and is scalable to multi-channel or multi-chip sensor configuration to support large touch screens or a high number of sensors. In one embodiment, the sensor scanning module is an independent and autonomous block that is portable to different technology nodes or different product families without system level performance impacts or implementation difficulties in applications that require a highly integrated device. The sensor scanning module may operate independently of the rest of the system in the device to support always-on scanning operation while the rest of the system is in a low power sleep mode.

In one embodiment, the sensor scanning module operates in a chained-scan using direct memory access (CS-DMA) mode to perform scanning of all sensors within a frame without requiring CPU intervention or generating CPU interrupts after every scan in the frame. The CS-DMA mode re-uses general purpose resources such as a DMA engine along with a sequencer or a finite state machine (FSM), and a live configuration register set. Re-use of the general purpose resources helps to lower the die area and cost of the sensor scanning module. The sensor scanning module may automate the scan operation using a combination of the FSM and the DMA engine to avoid repetitive interrupts after every scan in the frame. The sensor scanning module may access the memory using the DMA engine without CPU intervention to access the scan configuration data and to initiate the scan for a sensor in the frame. At the end of the frame, the sensor scanning module may trigger a DMA engine to read out the scanned data of the frame and may generate an interrupt or other types of signaling event for the CPU to process the scanned data.

In one embodiment, the sensor scanning module operates in an autonomous scan-multiple scans (AS-MS) mode to perform scanning of all sensors within a frame without requiring CPU intervention or generating CPU interrupts after every scan in the frame. The sensor scanning module may use a dedicated local memory (e.g., RAM) to store the sensor configurations for the sensors in the frame, a FSM to control the operation of the sensor scanning module, and a live configuration register set. Similar to the CS-DMA mode, the sensor scanning module in the AS-MS mode may automate the scan operation using the FSM to avoid repetitive interrupts after every scan in the frame. Unlike the CS-DMA mode, the sensor scanning module in the AS-MS mode may avoid the DMA operation and the associated bus arbitration when accessing the scan configuration data by downloading the scan configuration data from the local memory into the live configuration register set. At the end of the frame, the sensor scanning module may generate an interrupt or other types of signaling event for the CPU to read out and process the scanned data of the frame.

In one embodiment, the sensor scanning module operates in an autonomous low-power always-on scan (LP-AOS) mode by handling multiple frames of scan without CPU interaction until a touch event is detected. Unlike the CS-DMA or the AS-MS modes, the sensor scanning module in the LP-AOS mode does not interrupt the CPU to read out and process the scanned data at the end of every frame. Instead, the sensor scanning module processes the scanned data from one or more frames until user interaction is detected and CPU intervention is requested. The CPU and the rest of the system may operate in a low power sleep mode without periodically waking up in an active mode to process the scanned data, reducing the peak and average current consumption. The LP-AOS mode may operate in a power domain independent from the rest of the system actively, providing consistent refresh rate and low touch-to-system wake up latency regardless of the power mode of the system.

In one embodiment, the sensor scanning modules in a multi-channel or multi-chip configuration may be synchronized to support a large touch screen or a high number of sensors. To synchronize their operations, multiple sensor channels may use a unanimous consent, referred to as a consensus method, to start the scan, thereby avoiding the need for time-bond action or synchronization from the CPU. The multiple sensor channels or multiple sensor chips may operate under any one of the CS-DMA, AS-MS, or LP-AOS autonomous sensing modes to achieve low power operation without CPU intervention, conserving power, improving performance through a consistent refresh rate and low touch-to-system wake up latency in all power modes of the system, and providing a scalable solution to combine any number of channels or chips to scan a large panel.

In one embodiment, a capacitive sensing device is disclosed. The capacitive sensing device includes a process and an autonomous capacitive sensing subsystem (ACSS). The ACSS may receive a start frame event trigger by the processor. When the start frame event is received, the ACSS may load without processor intervention sensor configuration for a scan of a capacitive touch interface in a frame. The frame may include multiple scans. The ACSS may scan the capacitive touch interface using the first sensor configuration and may receive sensor data. The ACSS may determine if there is any additional scan of the frame to be performed. If there are additional scans in the frame to be performed, the ACSS may load without processor intervention the next sensor configuration. The ACSS may scan the capacitive touch interface using the next sensor configuration. If there is no additional scan of the frame, the ACSS may generate an interrupt or other types of signaling event to request the processor to process the sensor data.

Figure 2:
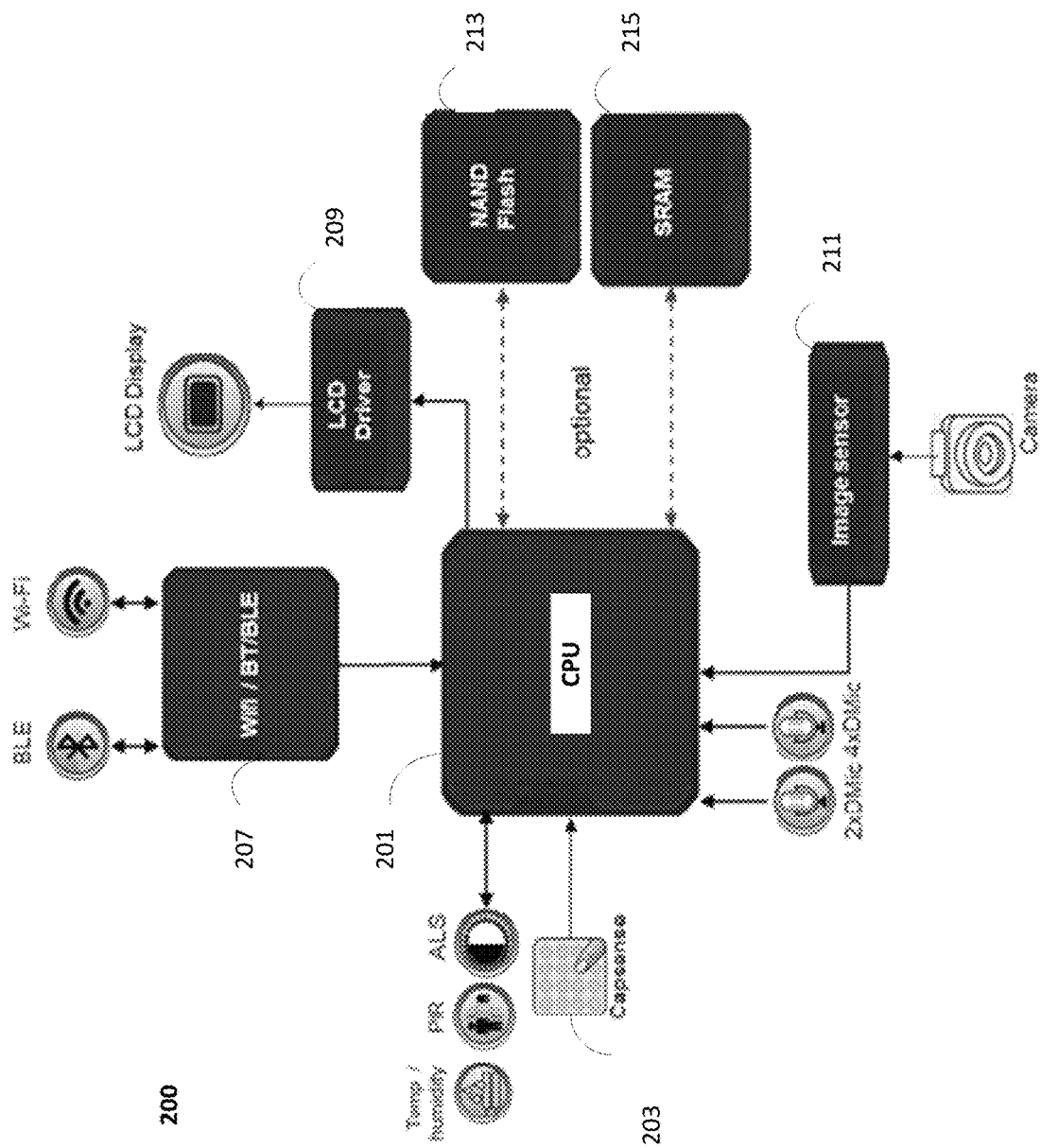
FIG. 2 illustrates a highly-integrated electronic circuit that implements touch sensing capability, wireless connectivity, audio processing, LCD display driver, image capture, and other user interface used in IoT applications in accordance with one embodiment of the present disclosure.

FIG. 2 illustrates a highly-integrated electronic circuit 200 that implements touch sensing capability, wireless connectivity, audio processing, LCD display driver, image capture, and other user interface used in IoT applications in accordance with one embodiment of the present disclosure. Electronic circuit 200 may include a sensor scanning module 203 that scans a frame of capacitive sensors to implement the touch sensing capability. The electronic circuit 200 may include a WiFi/Bluetooth module 207 to implement wireless connectivity, an LCD driver 209 to implement a display capability, and an image sensor 211 to capture image from a camera. Electronic circuit 200 may include a CPU 201 to manage the operations of the various functionalities and interfaces. Memories such as a NAND flash 213 and SRAM 215 may be integrated with, or external to, the electronic circuit 200. Sensor scanning module 203 may operate under one of the CS-DMA, AS-MS, or LP-AOS autonomous sensing modes to perform a frame of sensor scan without intervention by the CPU 201. In one embodiment, electronic circuit 200 including the CPU, WiFi/Bluetooth module 207, LCD driver 209, and the image sensor 211 may operate in a sleep mode on a power domain independent from the power domain of sensor scanning module 203 while the capacitive sensors are being scanned. In one embodiment, sensor scanning module 203 may have DMA capability to access SRAM 215 without CPU intervention to download configuration data for the sensors from SRAM 215 or to write sensor scanned data from the frame to SRAM 215.

Figure 3:
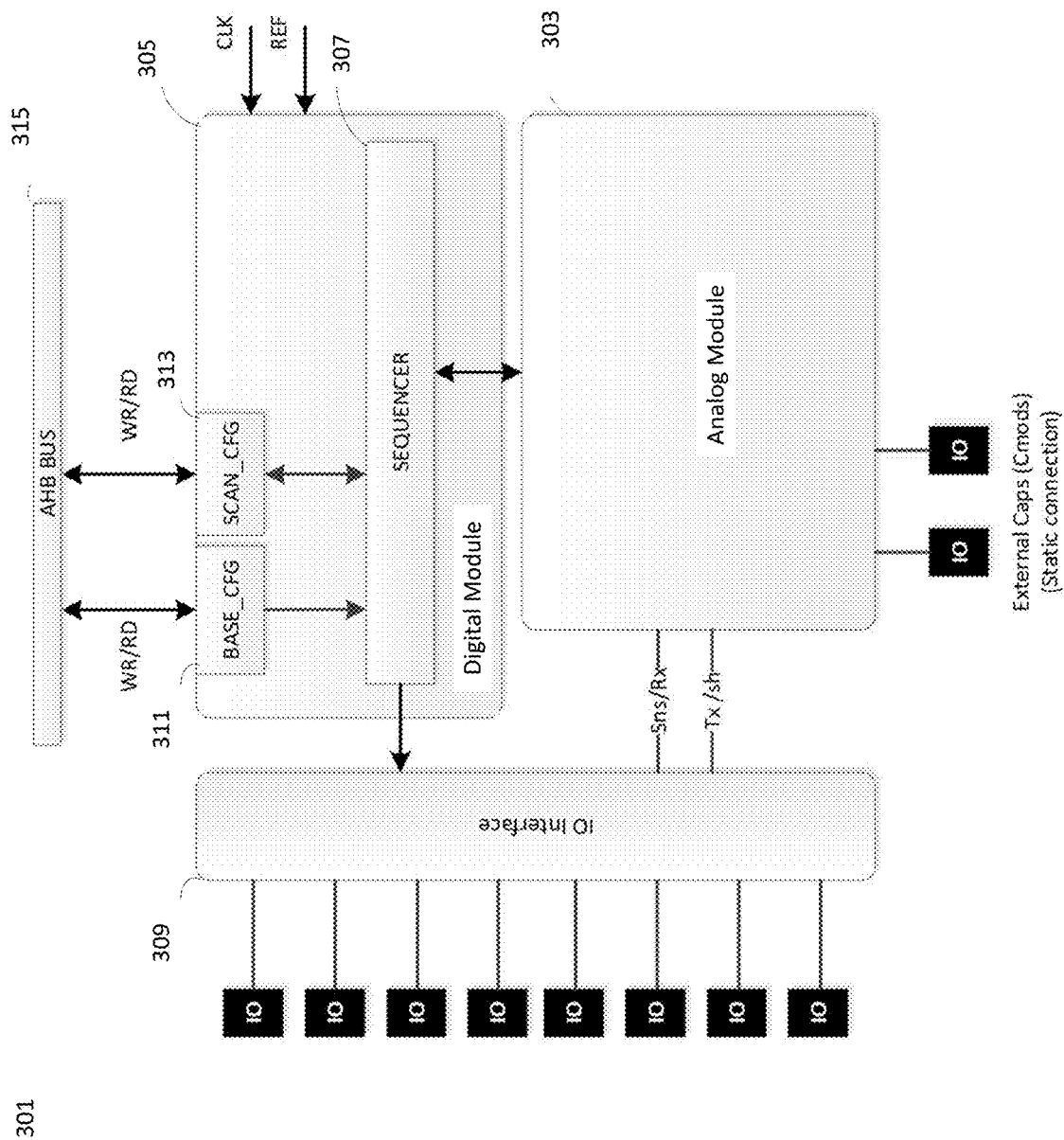
FIG. 3 illustrates a functional block diagram of a sensor scanning module that performs autonomous scanning of all sensors in a frame without using CPU intervention or interrupts after every scan in a chained-scan using direct memory access (CS-DMA) mode in accordance with one embodiment of the present disclosure.

FIG. 3 illustrates a functional block diagram of a sensor scanning module 301 that performs autonomous scanning of all sensors in a frame without using CPU intervention or interrupts after every scan in the CS-DMA mode in accordance with one embodiment of the present disclosure. Sensor scanning module 301 may be module 203 of FIG. 2. Sensor scanning module 301 may have an analog module 303 that implements analog components of sensing circuit and a digital module 305 that implements digital circuits of sensing circuit. A sequencer 307 may implement an FSM and register map interface to support the FSM operation. An IO interface enables sensor scanning module 301 to sense a frame of capacitive sensors connected through IO pins.

A register interface that includes base configuration registers (BASE CFG) 311 and scan configuration registers (SCAN_CFG) 313 allows firmware running on CPU 205 to configure and control sensor scanning module 301 for every scan, every phase, or to configure the states of every associated IOs before and after each scan. Base configuration registers 311 may store control parameters that are configured one-time or less frequently by the CPU 205 through AHB bus 315. For example, base configuration registers 311 may be configured only at power up or only during mode transition. In one embodiment, base configuration registers 311 may include control parameters such as power mode, operating clock, start frame, abort scan command, status indications, operating mode and other controls.

Scan configuration registers 313 may store control parameters for sensor scan performed by sensor scanning module 301. In one embodiment, scan configuration registers 313 may include control parameters such as A-D conversion method, conversion configuration, input terminals, sensing or transmit clocks, number of sub-conversions, etc. Sequencer 307 may access scan configuration registers 313 to control execution of the FSM. Scan configuration registers 313 may be written by the CPU 205 or written from memory 215 through DMA. When a scan configuration is written into scan configuration registers 313 and a start scan bit (START_SCAN) is enabled, sequencer 307 may run the FSM to control analog 303, digital 305, and IO interface 309 to complete a scan including all phases involved using the configured parameters.

Upon the completion of the scan, sequencer 307 may trigger a DMA request to copy the scan configuration parameters for the next scan of the frame from memory 215 to scan configuration register 313. Sequencer 307 may initiate the next scan of the frame using the newly configured parameters. Thus, sequencer 307 may complete a scan, trigger a DMA transfer to write the next scan configuration parameters, and start the next scan without CPU intervention for successive scans of the frame, giving rise to the name "chained scan." In one embodiment, at the end of the frame, sequencer 307 may trigger a DMA transfer to read out the scanned frame data to memory 215 and to generate an interrupt to request CPU 205 to process the scanned framed data.

IO interface 309 may connect external sensors on general purpose IOs (GPIOs) to sensing circuit in analog 303 and digital 311. IO interface 309 may drive sensor excitation signals, for example, sense and shield signals for self-cap scan or Tx clocks and Rx signals for mutual cap and inductive scans. In one embodiment, the IOs associated with sensor scan have two states, active and inactive, and an additional optional state, shield, applicable only in self-cap scan. Active state is when a scan is in progress on a given IO; inactive state is when there is no scan on a given IO. However, sending module 301 may perform scan on other IOs. Shield state is when non-active IO is excited using shield signal as part of a scan. All IOs are in inactive state by default when there is no scan in progress. If there is scan in progress on an IO or a set of IOs, the remaining IOS are in the inactive state, or the shield state in self-cap scan.

A scan may involve multiple phases including fine and coarse initializations, epilogues and sub-conversions. Sequencer 307 may control the state of all associated IOs before and after the scan without CPU intervention. For example, sequencer 307 may configure the sensing circuit in in analog 303 and digital 311 to perform each phase to produce converted result without CPU intervention. In one embodiment, more than one IO may form a sensor, Tx or Rx electrodes in a configuration referred to as "ganged sensing."

Figure 4:
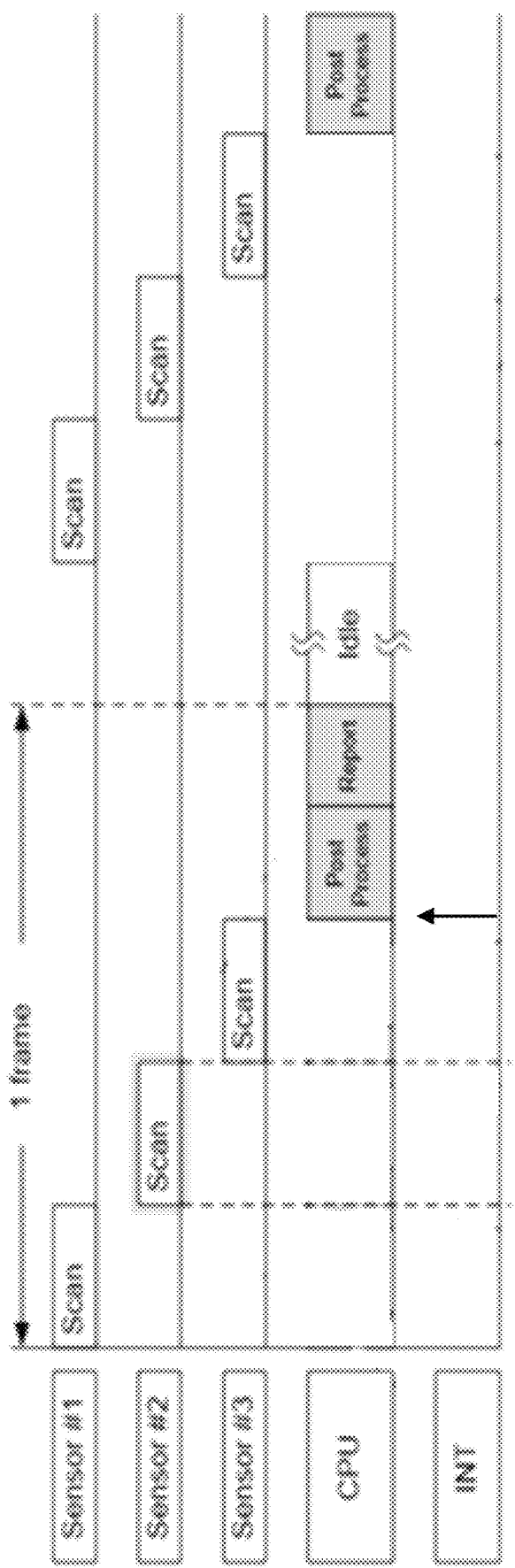
FIG. 4 illustrates a timeline for a sensor scanning module to perform a frame of scan in the CS-DMA mode in accordance with one embodiment of the present disclosure.

FIG. 4 illustrates a timeline for sensor scanning module 301 to perform a frame of scan in the CS-DMA mode in accordance with one embodiment of the present disclosure. The frame of scan encompasses three scans, one for each of the three sensors. To perform the scan by the first sensor, the CPU may load the base configuration register 311 to command sensor scanning module 301 to operate in the CS-DMA mode and to initiate the frame by setting a start frame bit (START_FRAME). Sensor scanning module 301 may initiate a DMA request to write the scan configuration parameters for the first sensor scan into the scan configuration registers 313. When the start scan bit (START_SCAN) is enabled, sensor scanning module 301 may scan the first sensor using the downloaded scan configuration parameters. At the completion of the scan, sensor scanning module 301 may generate a DMA request to write the scan configuration parameters for the second sensor scan into the scan configuration registers without CPU intervention. Sensor scanning module 301 may scan the second sensor using the updated scan configuration parameters. The operations may be repeated until all three scan of the frame are completed without CPU intervention. At the end of the frame, sensor scanning module 301 may trigger a DMA request to read out the scanned data for the three scans of the frame to system memory and to generate an interrupt to request the CPU to post process the scanned data of the frame to detect user interaction.

Figure 5:
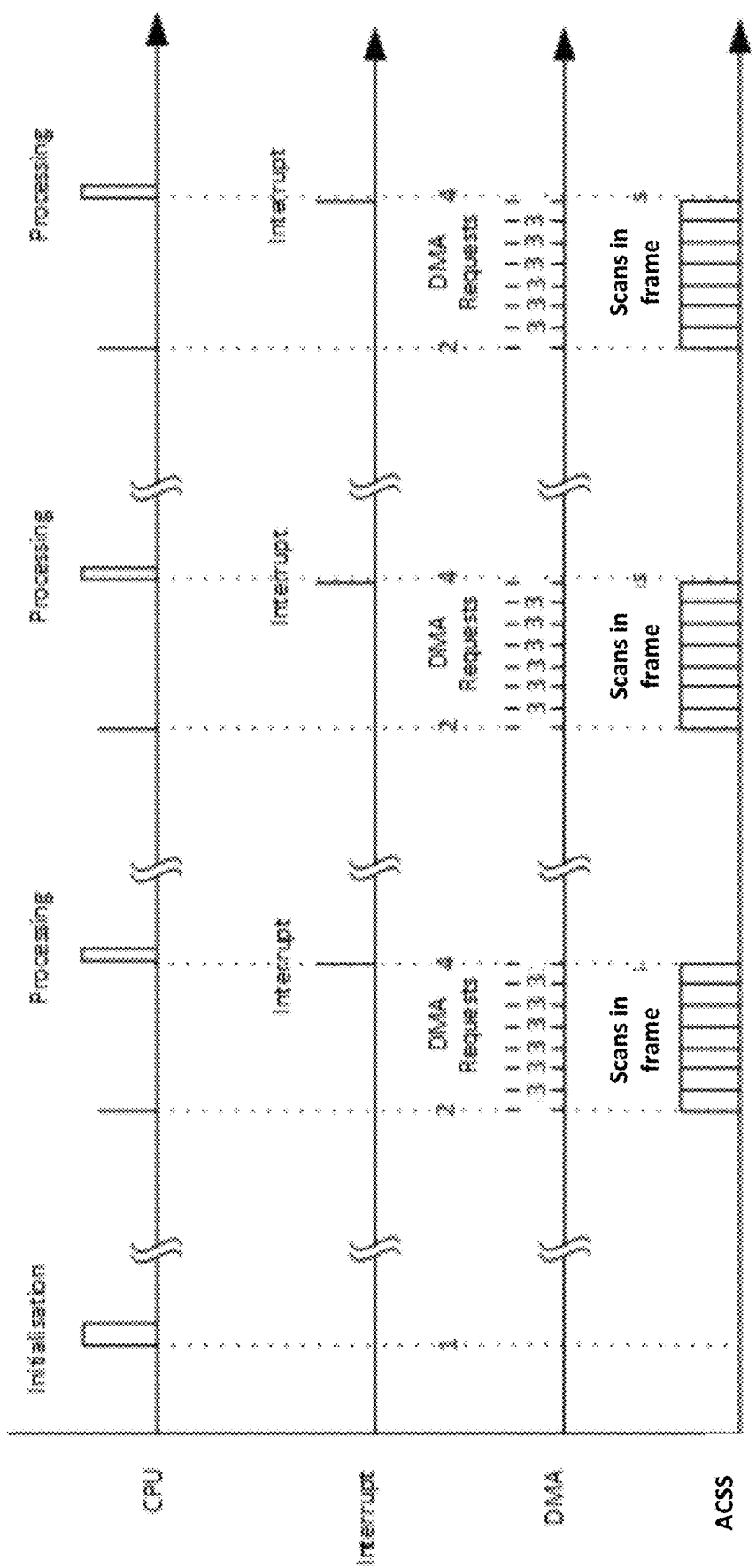
FIG. 5 illustrates a more detailed timeline for a sensor scanning module to perform three frames of scan in the CS-DMA mode showing the sensor scanning module issuing a DMA request at the end of each scan in a frame and generating an interrupt at the end of each frame in accordance with one embodiment of the present disclosure.

FIG. 5 illustrates a more detailed timeline for sensor scanning module 301, which can also be referred to as an autonomous capacitive sensing subsystem (ACSS), to perform three frames of scan in the CS-DMA mode showing the sensor scanning module 301 issuing a DMA request at the end of each scan in a frame and generating an interrupt at the end of each frame in accordance with one embodiment of the present disclosure. A FSM such as sequencer 307 may control the operations of sensor scanning module 301. At event 1, the CPU may initialize sensing scanning module 301 by configuring the base configuration registers 311. In one embodiment, the CPU may also configure the DMA channels for sensing scanning module 301 to perform DMA transfer to and from the system memory. The initialization by the CPU may happen at power up or when the CPU changes the sensor scanning mode. The scan configuration parameters for each sensor scan in the frame may be stored in the system memory, such as memory 215, in the form of memory array or an array of data structures.

At event 2, the CPU may initiate a frame start by setting the START_FRAME bit in base configuration registers 311. Sensor scanning module 301 may respond with a DMA request for the first sensor configuration parameters in the frame. When the DMA request is granted by a memory arbiter, a DMA engine in sensor scanning module 301 may transfer the first sensor configuration parameters from the system memory to scan configuration registers 313 without CPU intervention. The last register written by the DMA may contain the START_SCAN bit to start the first scan in the frame.

At event 3, the first scan is completed and sensor scanning module 301 may issue a DMA request to transfer the next sensor configuration parameters from the system memory to scan configuration registers 313 without CPU intervention. The last register written by the DMA may again contain the START-SCAN bit to start the next scan in the frame using the updated scan configuration parameters. The operations of using the end of each scan of the frame to transfer the scan configuration parameters for the next scan using DMA without relying on CPU intervention are repeated until all the scans of the frame are completed, hence the name "chained-scan."

At event 4, when all the scans of the frame are completed, sensor scanning module 301 may issue a DMA request to read out the scanned results of the frame to the system memory. There is no DMA request to transfer in the next sensor configurations parameters. Sensor scanning module 301 may generate an interrupt to allow the CPU to process the frame results read out by the DMA. After processing the frame results, the CPU may initiate the next frame when required by setting the START_FRAME bit in base configuration registers 311. Sensor scanning module may respond by triggering the DMA request for the first sensor configuration parameters in the frame to start the scan of the new frame. The frame interval may be determined by the application firmware. Thus, in CS-DMA mode, sensor scanning module 301 performs scans for the sensors of the frame based on configuration parameters written by DMA after each scan. Chip area saving may be achieved because the configuration parameters for all the sensor of the frame do not need to be stored in sensor scanning module 301. A DMA controller for implementing the DMA may be part of the general purpose resources.

Figure 6:
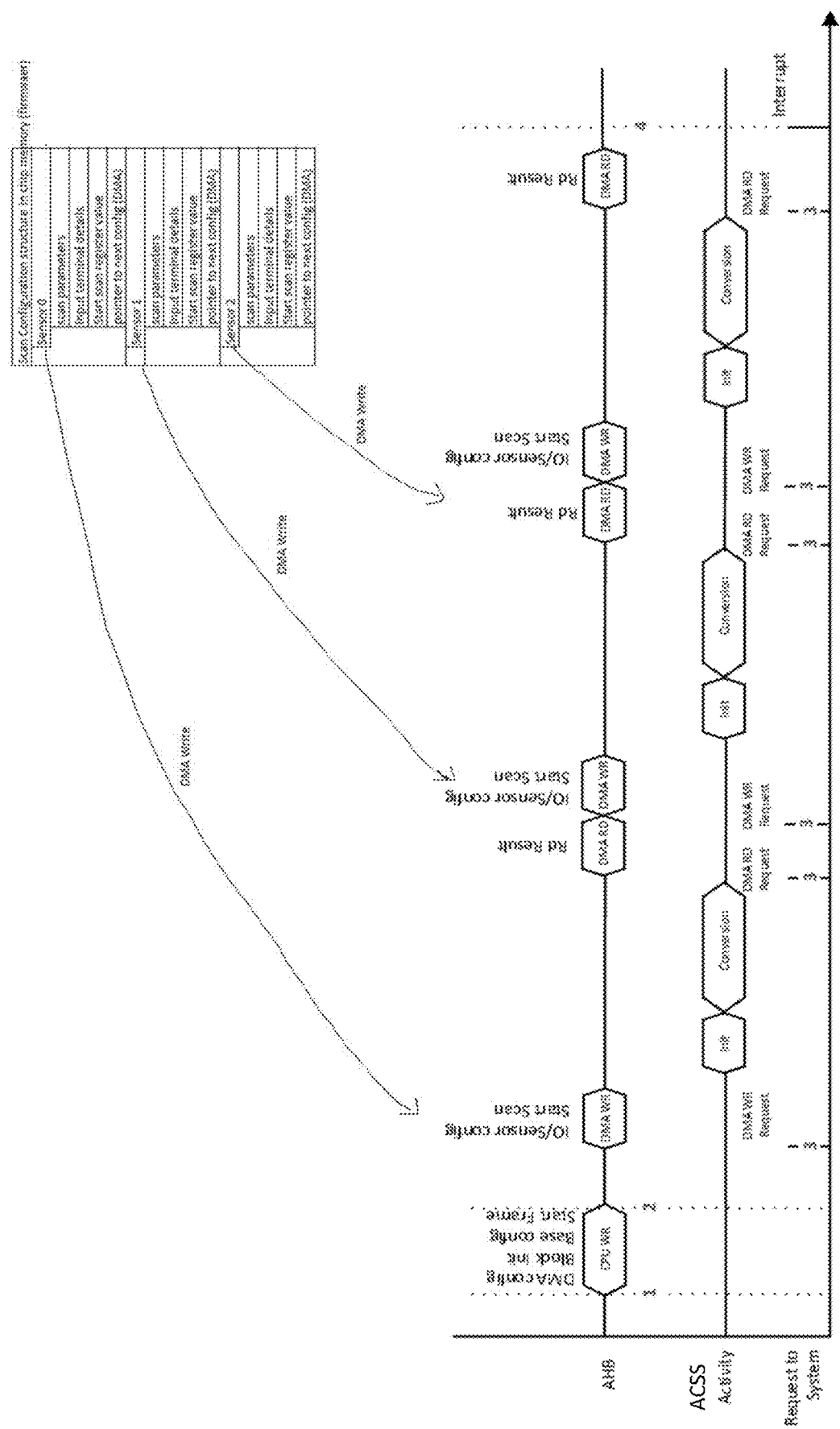
FIG. 6 illustrates a more detailed timeline for three sensors in a frame to be scanned in the CS-DMA method showing the sensor scanning module issuing a DMA request at the end of each sensor scan and generating an interrupt at the end of each frame in accordance with one embodiment of the present disclosure.

FIG. 6 illustrates a more detailed timeline for three sensors in a frame to be scanned in the CS-DMA method showing the sensor scanning module 301 issuing a DMA request at the end of each sensor scan and generating an interrupt at the end of each frame in accordance with one embodiment of the present disclosure. At event 1, the CPU executes write cycles in which the CPU may program the DMA channel, initialize the sensors, and configure base configuration register 311.

At event 2, the CPU may trigger the frame scan by setting the START_FRAME bit. In one embodiment, the frame trigger may be provided based on an external signal, such as a GPIO, or an internal signal such as a timer expiration event, eliminating the need for the CPU to periodically start the frame scan. The CPU may intervene only at the end of the frame to process the scanned data, not at the beginning of the frame, further conserving CPU bandwidth.

In response to the START_FRAME bit, sensor scanning module 301 may issue a DMA write request, shown as the first instance of event 3, to transfer the sensor configuration for the first sensor from the system memory to scan configuration registers 313. The sensor configuration may include scan parameters, input terminal details, start scan register value such as the START SCAN bit used to start the scan, and a pointer to the sensor configuration for the next sensor. Sensor scanning module 301 may start the scan of the first sensor and perform conversion of the scanned data.

At the completion of the first scan, sensor scanning module 301 may issue a DMA read request to read out the scanned results to the system memory, shown as the second instance of event 3. Sensor scanning module 301 may issue a DMA write request, shown as the third instance of event 3, to transfer the sensor configuration for the next sensor from the system memory. In one embodiment, the DMA read request at the end of each scan to read out the scanned results may be avoided by storing the scanned results in sensor scanning module 301, such as using a FIFO, until all the scans for the frame are completed. At the end of the frame, sensor scanning module 301 may issue a DMA read request to read out the scanned results for all the sensors of the frame to the system memory. At event 4, sensor scanning module 301 may generate an interrupt for the CPU to process the scanned results to determine a user interaction such as a touch or a gesture.

In CS-DMA mode, sensor scanning module 301 autonomously performs frame scan conversions based on configuration parameters written to scan configuration registers 313 by DMA transfers. At the end of each scan except the last one, sensor scanning module 301 issues a DMA request to load the next configuration so that the scans are "chained" using the DMA without CPU intervention to initiate each scan. Each scan of the frame is independent from other scans. The configuration parameters for the scans may be different. Advantageously, no CPU bandwidth is needed except to initialize the sensors and configure base configuration register 311 at the start of the frame scan, and to process the scanned results at the end of the frame. However, the CPU and the rest of the system in the device may have to be in the active mode as the CS-DMA mode requires memory bus access for the DMA transfers between the scan configuration stored in the system memory and scan configuration registers 313 in sensor scanning module 301.

Figure 7:
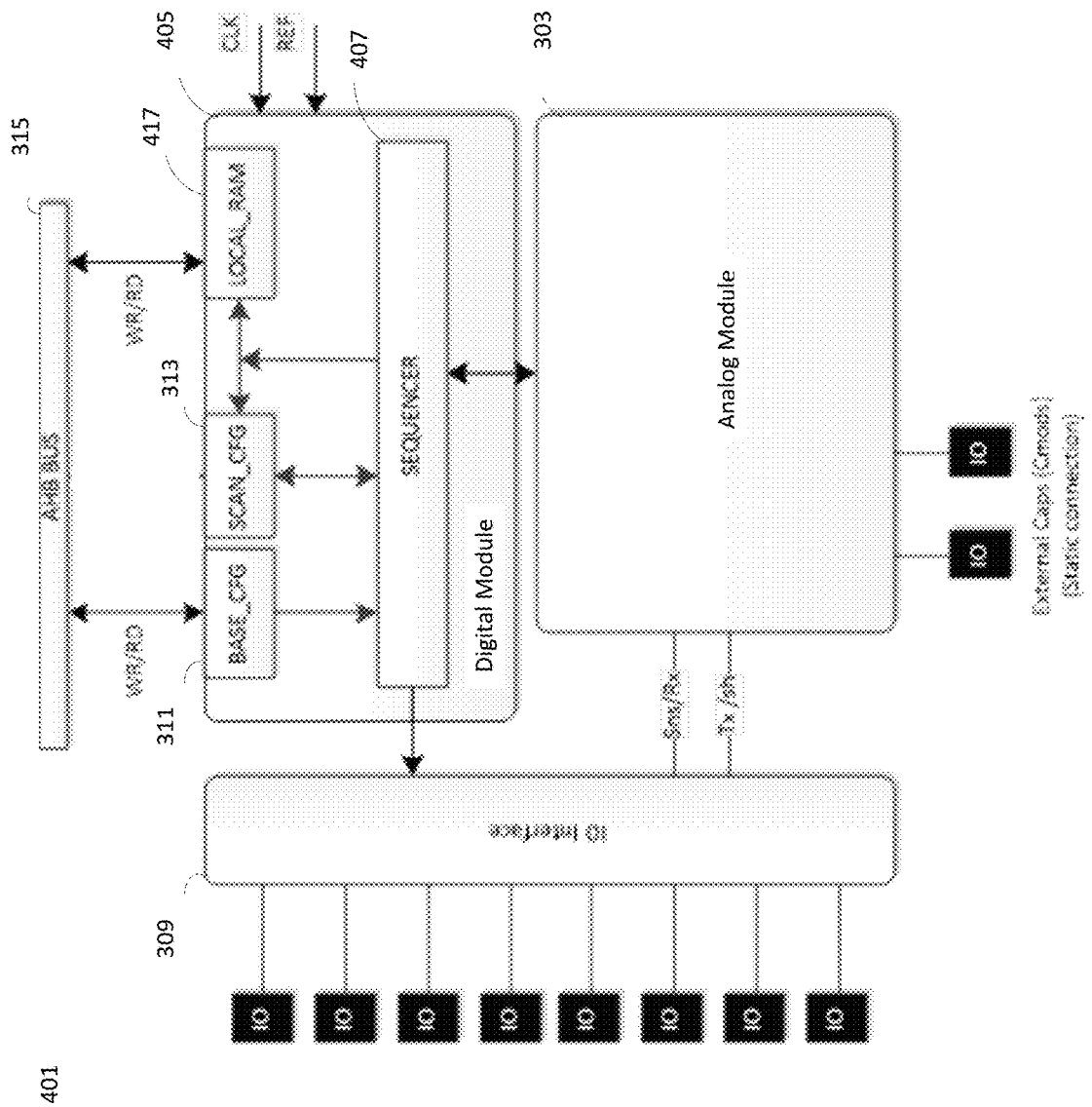
FIG. 7 illustrates a functional block diagram of a sensor scanning module that performs autonomous scanning of all sensors in a frame without using CPU intervention, interrupts, or DMA resources after every scan in an autonomous scan-multiple scans (AS-MS) mode in accordance with one embodiment of the present disclosure.

FIG. 7 illustrates a functional block diagram of a sensor scanning module 401 that performs autonomous scanning of all sensors in a frame without using CPU intervention, interrupts, or DMA resources after every scan in an autonomous scan-multiple scans (AS-MS) mode in accordance with one embodiment of the present disclosure. Sensor scanning module 401 may be module 203 of FIG. 2. Analog module 303, I/O interface 309, base configuration registers 311 and scan configuration registers 313 of digital module 405, and AHB bus 315 of sensor scanning module 401 are similar to those of sensor scanning module 301 for the CS-DMA mode and the description of these module will not be repeated for sake of brevity.

Sensor scanning module 401 may operate autonomously to perform scanning of all sensors in a frame without requiring CPU intervention or generating CPU interrupts after every scan, similar to the CS-DMA mode. However, unlike the CS-DMA mode, a local memory 417 of digital module 405 stores sensor scan configuration parameters for the sensors of one or more frames of scan. Local memory 417 may be a RAM. In one embodiment, local memory 417 may be implemented as one or more banks of registers. Scan configuration registers 313 may load the sensor scan configuration parameters for successive scans of the frame from local memory 417 instead of from the system memory through DMA as in the CS-DMA mode.

Advantageously, in the AS-MS mode, the CPU, DMA, and the AHB bus 315 are not used during the frame scan, avoiding the need for the CPU or the rest of the system to stay in the active mode to support the DMA operations during the frame scan, at the expense of local memory 417. A sequencer 407 may run a FSM to control the operations of sensor scanning module 401 to complete a frame scan.

Figure 8:
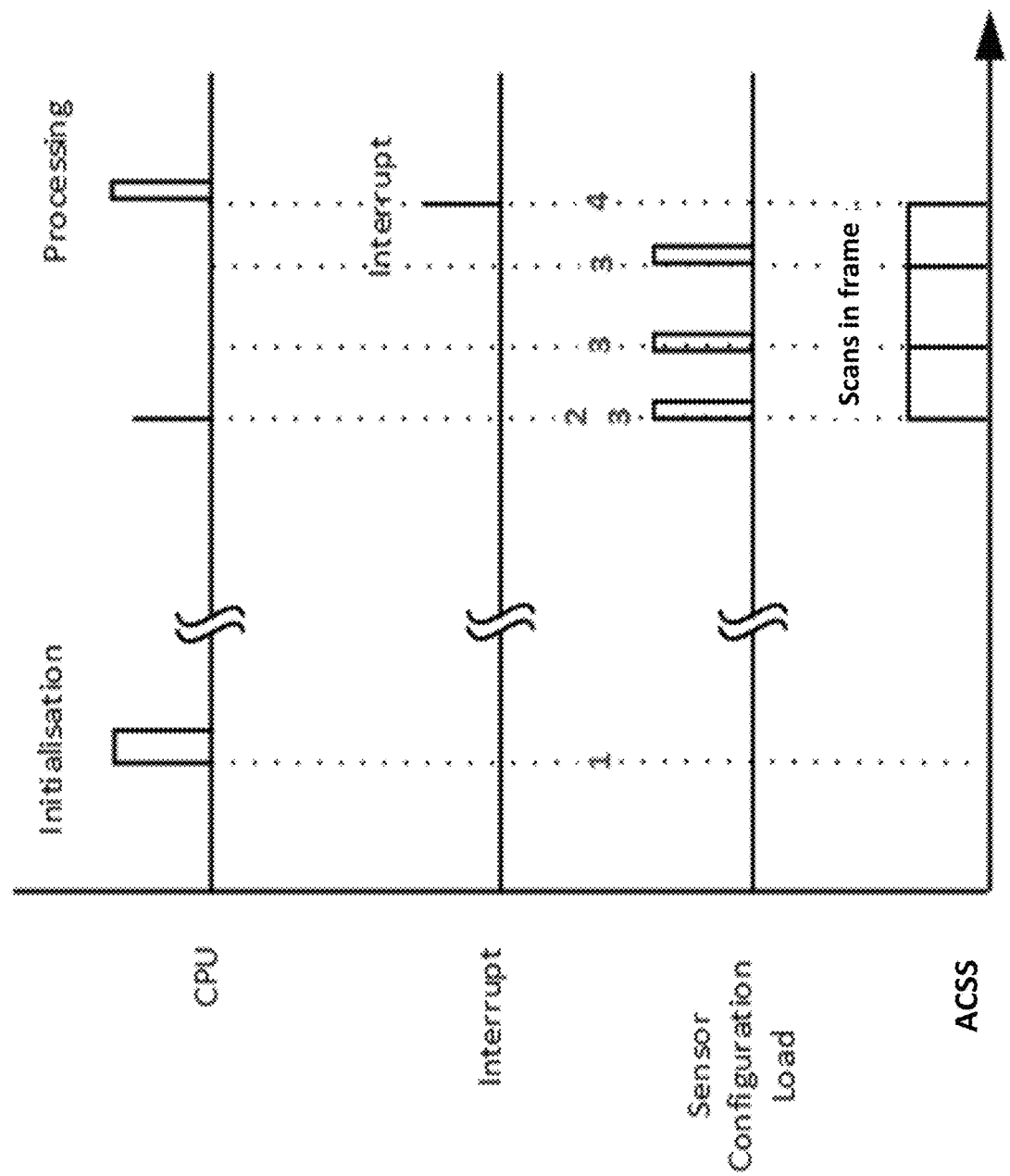
FIG. 8 illustrates a timeline for a sensor scanning module to perform a frame of scan in the AS-MS mode showing the sensor scanning module configuring the scans without requiring DMA resources and generating an interrupt at the end of the frame in accordance with one embodiment of the present disclosure.

FIG. 8 illustrates a timeline for sensor scanning module 401 to perform a frame of scan in the AS-MS mode showing the sensor scanning module 401 configuring the scans without requiring DMA resources and generating an interrupt at the end of the frame in accordance with one embodiment of the present disclosure. CPU involvement is only needed for initialization prior to the start of the frame and for processing the scanned data at the end of the frame.

At event 1, the CPU may initialize sensor scanning module 401 by configuring the base configuration registers 311. The CPU may write the scan configuration parameters for the sensors of one or more frames into local memory 417. The scan configuration parameters for the sensors of the one or more frames may be stored in local memory 417 in the form of memory array or an array of data structures in a linked list. Event 1 my happen at power up or when the CPU changes the sensor scanning mode.

At event 2, the CPU may initiate a frame start by setting the START_FRAME bit in base configuration registers 311. In one embodiment, the frame trigger may be provided based on an external signal, such as a GPIO, or an internal signal such as a timer expiration event. This event triggers the first sensor configuration load event.

At event 3, sensor scanning module 401 loads the first sensor configuration parameters of the frame from local memory 417 to scan configuration registers 313. The last register written may contain the START_SCAN bit to start the first scan in the frame. Sensor scanning module 401 may perform the frame scan based on a linked list of sensor configuration parameters in local memory 417. Sensor scanning module 401 may maintain a pointer to this linked list to load the sensor configuration parameters for successive sensor scans over the duration of the frame by incrementing the pointer to point to the sensor configuration parameters for the next sensor once the scan for the current sensor is completed. FIG. 3 shows three sensor configuration load events from local memory 417 for the three scans of the frame.

At event 4, when all the scans of the frame are completed, sensor scanning module 401 may issue an interrupt to allow the CPU to read and process the frame results. After processing the frame results, the CPU may initiate the next frame when required by setting the START_FRAME bit in base configuration registers 311. If the scan configuration parameters for the sensors of the next frame are not already in local memory 417, the CPU may write the linked list of configuration parameters for the next frame into local memory 417. Sensor scanning module 401 may then be triggered to perform the next frame scan. The frame interval may be determined by the application firmware. In one embodiment, sensor scanning module 401 may use a timer to periodically provide triggers for the start of the frame rather than relying on the CPU to initiate the frame.

In AS-MS mode, sensor scanning module 401 autonomously performs frame scan conversions based on configuration parameters written to scan configuration registers from local memory 417. As in CS-DMA mode, no CPU bandwidth is needed except to initialize the sensors and configure base configuration register 311 at the start of the frame scan, and to process the scanned results at the end of the frame. The AS-MS mode offers the added benefit of not requiring the DMA channel and AHB bus arbitration to load the scan configuration parameters for each scan. Instead, the scan configuration parameters for all sensors in one or more frames are stored in local memory 417 at power up and sequencer 407 loops through the scan configuration parameters to complete a frame scan. Sensor scanning module 401 may work independently, requiring only clock and power from the rest of the system, allowing the rest of the system to be in a low power sleep mode during the frame scan. At the end of the frame, sensor scanning module 401 may issue an interrupt to allow the CPU to read and process the frame results to determine a user interaction such as a touch or a gesture.

Figure 9:
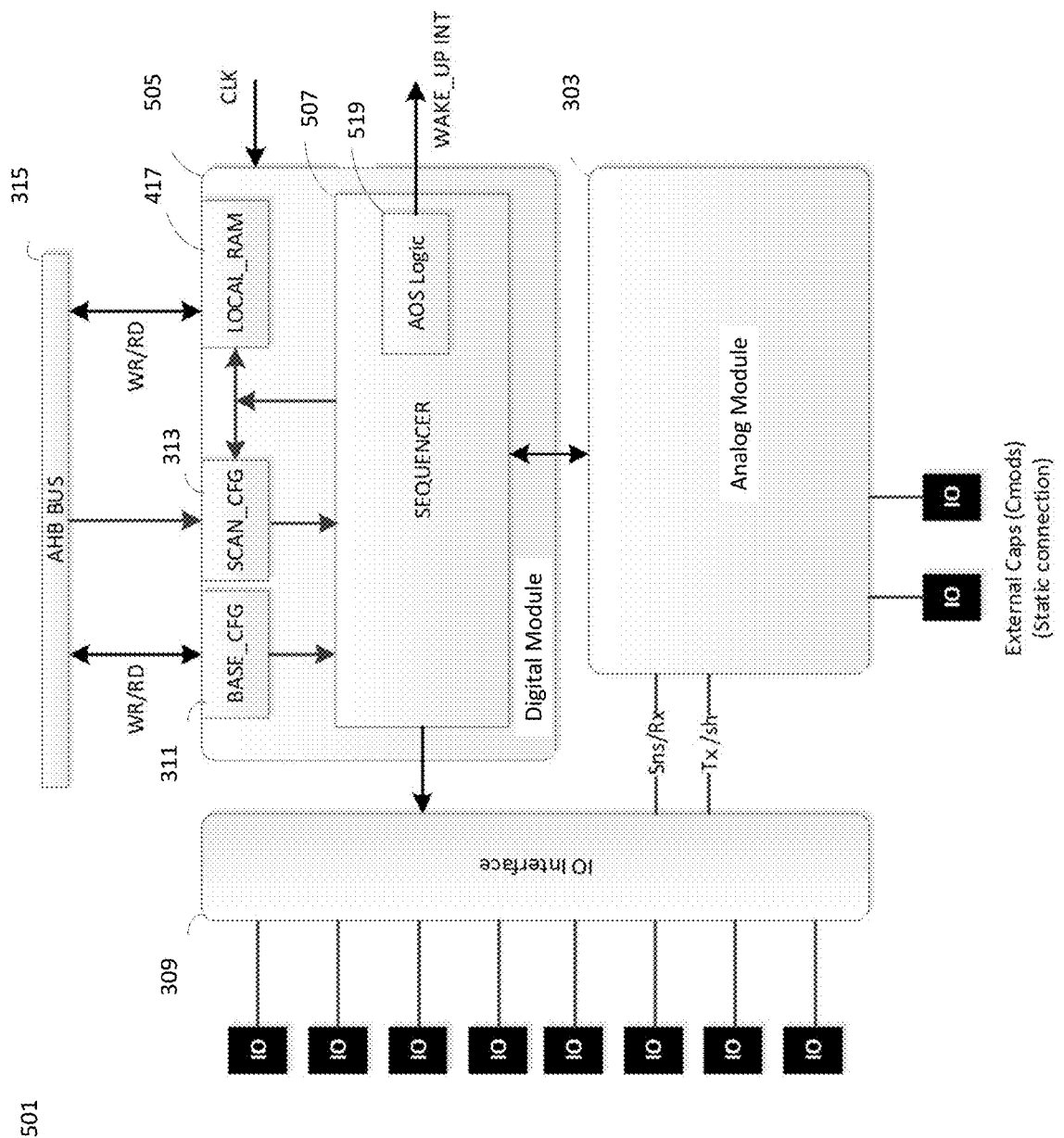
FIG. 9 illustrates a functional block diagram of a sensor scanning module that performs autonomous scanning of all sensors in a frame without using CPU intervention interrupts, or DMA resources after every scan or after every frame until user interaction is detected in a low-power always-on scan (LP-AOS) mode in accordance with one embodiment of the present disclosure.

FIG. 9 illustrates a functional block diagram of a sensor scanning module 501 that performs autonomous scanning of all sensors in a frame without using CPU intervention interrupts, or DMA resources after every scan or after every frame until user interaction is detected in a low-power always-on scan (LP-AOS) mode in accordance with one embodiment of the present disclosure. Sensor scanning module 401 may be module 203 of FIG. 2. The LP-AOS mode builds on the AS-MS mode. Analog module 303, I/O interface 309, base configuration registers 311 and scan configuration registers 313 of digital module 505, local memory 417, and AHB bus 315 of sensor scanning module 501 are similar to those of sensor scanning module 401 for the AS-MS mode and the description of these module will not be repeated for sake of brevity.

Similar to the AS-MS mode, the LP-AOS mode loads the scan configuration parameters for successive scans of one or more frames from a local memory 417 to complete the frame scan. However, unlike the AS-MS mode, the LP-AOS mode does not generate an interrupt to request the CPU to read out and process the scanned data at the end of every frame. Instead, sensor scanning module 501 includes an AOS data processing unit 519 that may process the scanned data during the frame to detect user interaction on the touch sensing interface. The capability for sensor scanning module 501 to process the scanned data to detect user interaction in the LP-AOS mode allows the CPU and the rest of the system to operate in a low power mode, as the CPU, DMA, and the AHB bus 315 are not used during the frame scan and the CPU does not need to process the scanned data at the end of every frame to identify a user touch event. Sensor scanning module 501 may operate from a separate power domain to actively perform the frame scan while the rest of the system is in a sleep mode. When AOS data processing unit 519 detects a user interaction, sensor scanning module 501 may issue an interrupt to wake up the CPU. The CPU may process the scanned data to identify complex user interaction such as gesture detection that is beyond the detection capability of AOS data processing unit 519. A sequencer 507 may run a FSM to control the operations of sensor scanning module 501 to complete a frame scan.

Figure 10:
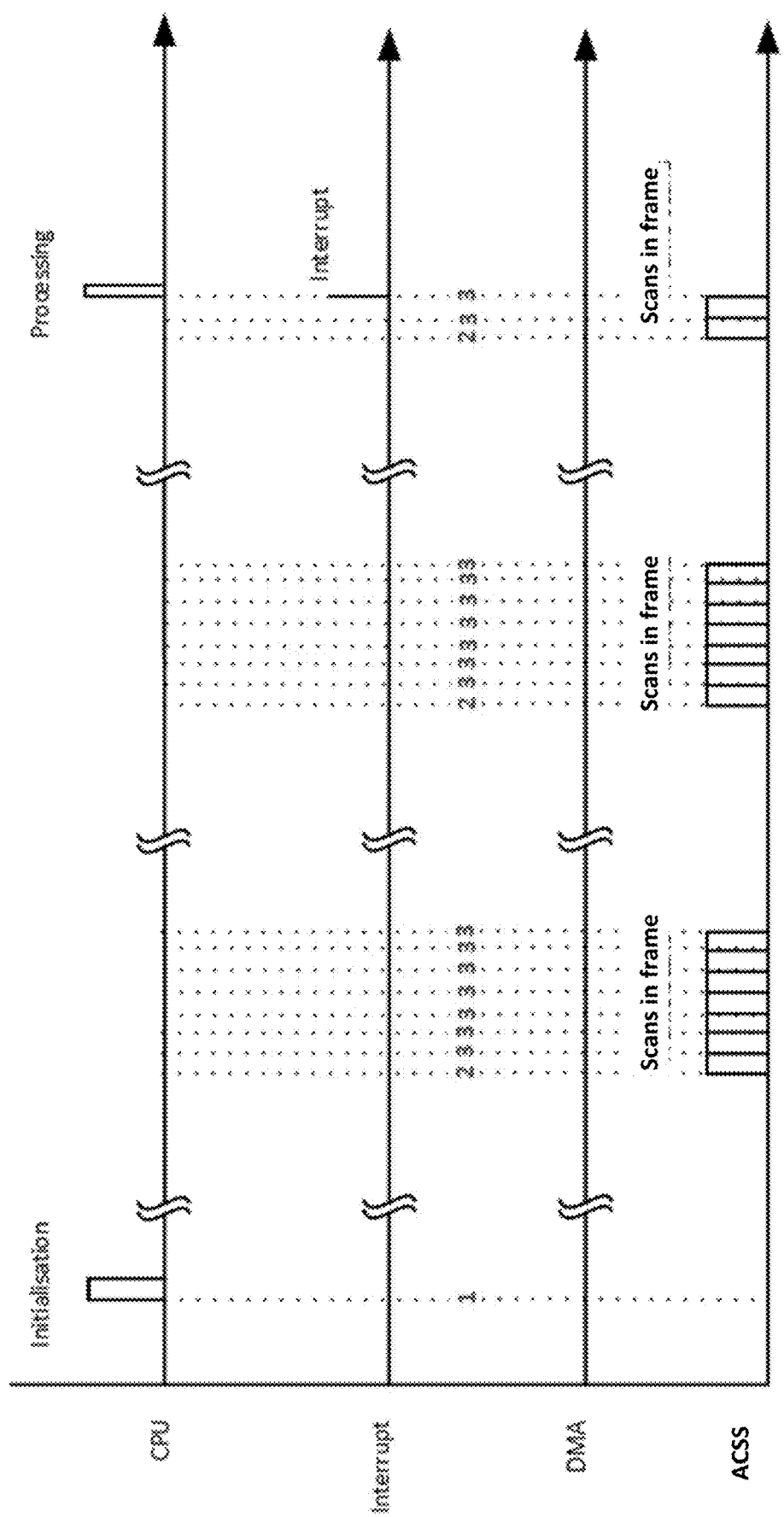
FIG. 10 illustrates a timeline for a sensor scanning module to perform frame scan in the LP-AOS mode showing the sensor scanning module configuring the sensors to perform multiple frames of scan and generating an interrupt to wake up the CPU that is in a sleep mode when a user touch event is detected at the end of two and a half frames in accordance with one embodiment of the present disclosure.

FIG. 10 illustrates a timeline for sensor scanning module 501 to perform frame scan in the LP-AOS mode showing the sensor scanning module 501 configuring the sensors to perform multiple frames of scan and generating an interrupt to wake up the CPU that is in a sleep mode when a user touch event is detected at the end of two and a half frames in accordance with one embodiment of the present disclosure. CPU involvement is only needed for initialization prior to the start of the first frame scan and for processing the scanned data when sensor scanning module 501 detects a user interaction.

At event 1, the CPU may initialize sensor scanning module 501 by configuring the base configuration registers 311. The CPU may write the scan configuration parameters for the sensors of one or more frames into local memory 417. The scan configuration parameters for the sensors of multiple frames may be stored in local memory 417 in the form of memory array or an array of data structures in a linked list. Event 1 my happen at power up or when the CPU changes the sensor scanning mode.

At event 2, a LP-AOS timer expires to trigger sequencer 507 to initiate the frame scan. In one embodiment, the frame trigger may be provided based on an external signal, such as a GPIO. This event triggers the first sensor configuration load event. Sensor scanning module 501 loads the first sensor configuration parameters of the frame from local memory 417 to scan configuration registers 313. The last register written may contain the START_SCAN bit to start the first scan in the frame. Sensor scanning module 401 may perform the frame scan based on a linked list of sensor configuration parameters in local memory 417. Sensor scanning module 401 may maintain a pointer to this linked list to load the sensor configuration parameters for successive sensor scans over the duration of the frame by incrementing the pointer to point to the sensor configuration parameters for the next sensor once the scan for the current sensor is completed. In one embodiment, the sensor configuration parameters may change from frame to frame and local memory 417 may store the linked list of sensor configuration parameters for multiple frames.

At event 3, at the end of every scan in a frame, AOS data processing unit 519 processes the scanned data to detect user interaction or if programmed conditions are met. FIG. 10 shows that no user interaction or programmed conditions are detected in the first two frames. In this scenario, at the end of each of the first two frames, sensor scanning module 501 restarts the timer. When the timer expires, sequencer 507 is triggered to initiate a new frame scan. In the third frame after two scans, AOS data processing unit 510 detects a user interaction. Sensor scanning module 501 may generate an interrupt to wake up the CPU. The CPU may transition to an active mode to read the scanned data from sensor scanning module 501 and may process the scanned data to further identify the user inaction. In one embodiment, AOS data processing unit 510 may execute a simple algorithm to determine if there is a potentially valid user interaction or programmed condition at the end of every scan. If there is, sensor scanning module 501 may wake up the CPU to execute more complex algorithm to detect more complex gestures. In one embodiment, the scanned data may be stored in data storage such as a FIFO. The CPU may read the data storage to retrieve the scanned data for further processing.

Advantageously, the LP-AOS mode allows sensor scanning module 501 to operate in an "always-on" mode while reducing overall system power consumption as sensor scanning module 501 operates from its separate power domain and does not need to periodically wake up the rest of the system. The results are a high refresh rate or low touch-to-wake-up latency without increasing the average system power consumption. Sensor scanning module 501 as an independent and standalone module may also be flexibly ported to different systems without system level impact, allowing the solution for the touch sensing interface to be tailored to different applications. In one embodiment, a sensor scanning modules may operate in any of the CS-DMA, AS-MS, or LP-AOS modes in a time multiplexed fashion. For example, the sensor scanning module may operate in the LP-AOS mode for some time and on specific events in the system, change to the CS-DMA or AS-MS mode.

Figure 11:
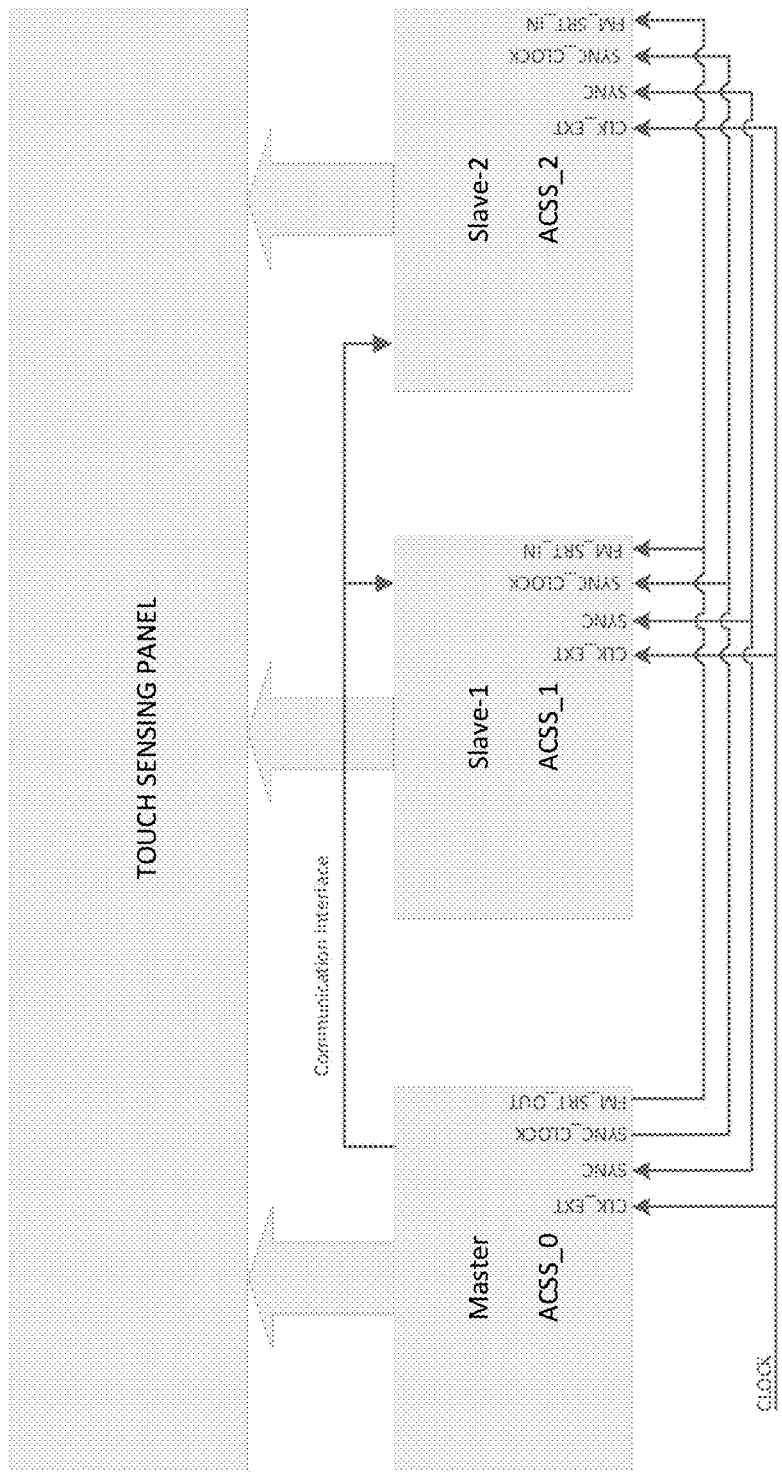
FIG. 11 illustrates an interface to synchronize multiple sensor channels or multiple sensor chips to perform multiple sensor scans simultaneously for supporting touch panels with a large number of sensors in accordance with one embodiment of the present disclosure.

FIG. 11 illustrates an interface to synchronize multiple sensor channels or multiple sensor chips to perform multiple sensor scans simultaneously for supporting touch panels with a large number of sensors in accordance with one embodiment of the present disclosure. To support touch panels with a large number of sensors (e.g., large touch screen) using simultaneous multi-channel scanning, sensor scanning modules in the multiple sensor channels or multiple sensor chips may have to be synchronized. For example, the sensor or Tx clock of all the sensor channels may have to be synchronized and phase aligned to avoid cross-talk between the channels. The operating clock for the sensor scanning modules (301, 401, or 501) may be synchronized as well, though not necessarily phase aligned.

When the multiple sensor scanning modules are operating in the CS-DMA mode, the latency associated with loading the sensor configuration parameters for a scan through the DMA may be different for each sensor scanning module. The latency may be a function of the status of the DMA channel and system memory bandwidth when the sensor scanning modules access different system memories and is further complicated by DMA arbitration when the sensor scanning modules access a common system memory. Because multiple sensor scanning modules may not complete loading the sensor configuration parameters for the next sensor scan at the same time, a unanimous consent mechanism, referred to as a consensus mechanism, may be implemented to indicate that all sensor scanning modules are ready to synchronize the multi-channel sensor scan.

FIG. 11 shows three sensor scanning modules to support simultaneous three-channel scanning of the touch sensing panel. The sensor scanning modules, which can also be referred to as autonomous capacitive sensing subsystems (ACSS), may be the module 301 of the CS-DMA mode and may reside in three chips. A master sensor scanning module may generate the sensor/Tx clock signal (SYNC_CLOCK) and the frame start signal (FM_SRT_OUT) to be received by two slave sensor scanning modules to synchronize the operations of the three channels. The sensor/Tx clock signal is used to drive sensor or Tx electrodes in all three sensor scanning modules to ensure sensor scans in all three channels are synchronized and phase aligned. The frame start signal is used to synchronize the start of the frame. When the CPU in the master sensor scanning module writes the START_FRAME bit in base configuration registers 311, the master sensor scanning module starts the frame by initiating a DMA request to load the scan configuration parameters for the first sensor scan into its scan configuration registers 313. The master sensor scanning module generates FM_SRT_OUT to provide the trigger to start the frame for the slave modules. When the two slave sensor scanning modules receive FM_SRT_IN, the slave modules also initiate their own DMA requests to load the scan configuration parameters for their respective first sensor scan. In one embodiment, the frame start signal may be provided based on an external signal, such as a GPIO, or an internal signal such as a timer expiration event, eliminating the need for the CPU to periodically start the frame scan. In one embodiment, all three sensor scanning modules receive a common high-speed external clock (CLK_EXT) to synchronize their clock operations. In one embodiment, the master sensor scanning module may output a system clock or a low frequency version of the system clock to the two slave sensor scanning modules for the two slave sensor scanning modules to synchronize their system clocks.

A SYNC signal, which may also be referred to as a busy signal, is a bidirectional (e.g., open-drain resistive pull-up) signal used by all three sensor scanning modules to indicate a consensus busy/ready status. In one embodiment, driving SYNC to low indicates at least one of the sensor scanning modules is busy and thus not ready to start the scan. A rising edge on SYNC indicates a consensus from all three sensor scanning models that they are all ready to start the scan. For example, when the CPU writes the START_FRAME bit in the master sensor scanning module, the master sensor scanning module starts its scan configuration load operation and triggers the scan configuration load operations in the two slave sensor scanning modules using the FM_SRT_OUT. All three sensor scanning modules may drive SYNC to low to indicate a busy status. When a sensor scanning module completes its scan configuration load operation and is ready to start the scan, the sensor scanning module releases SYNC. However, when at least one other sensor scanning module is still busy loading the scan configuration parameters, SYNC remains low. A rising edge is observed on SYNC only when all three sensor scanning modules complete their scan configuration load operations and release SYNC to indicate they are ready to scan. Thus, the scan for all three channels starts only on "consensus" from all three sensor scanning modules. In one embodiment, SYNC may be driven low as soon as a start frame signal or a configuration load request is received. In one embodiment, the rising edge of SYNC may be sampled on the rising edge of the sensor/Tx clock signal (SYNC_CLOCK) signal to avoid synchronization issues between the sensor scanning modules arising from a slow rise time of SYNC due to a weak pull up resistor. In the CS-DMA mode, the order of completion of the scan configuration load operations for the three channels may be different for different scans because each DMA channel may have different latencies due to DMA status and system memory bandwidth at any point in time. The consensus mechanism implemented by SYNC ensures that the start of the scan for all the channels are synchronized only when all the sensor scanning modules are ready.

When a scan is in progress, SYNC may remain high. If any sensor scanning module completes its scan and initiates the next scan configuration loading operation by driving SYNC to low, all other sensor scanning modules may treat the falling edge of SYNC as a request to perform the next scan. All the other sensor scanning modules may immediately hold SYNC at low to indicate the busy state. A sensor scanning module may release the SYNC only when the current scan is completed, the scan configuration loading operation for the next scan is completed, and it is ready to start the next scan. The next scan for all three channels will start only on consensus from all three sensor scanning modules that they are ready. In this way, if a sensor scanning module finishes its current scan early (e.g., a smaller number of sub-conversions in a scan due to a circular touchpad design), it will wait for all the other sensor scanning modules to complete their current scan and to complete loading the scan configuration parameters for the next scan before starting the next scan for all the channels at the same time.

While the operation of SYNC to synchronize the scans on all the channels is described for the CS-DMA mode, the consensus mechanism is equally applicable to the AS-MS or the LP-AOS mode. For example, in the AS-MS or the LP-AOS mode, a sensor scanning module may assert SYNC by driving SYNC to low when the sensor scanning module initiates loading the sensor configuration parameters from the local memory. When a sensor scanning module completes loading the scan configuration parameters from the local memory and is ready to start the scan, the sensor scanning module releases SYNC. However, SYNC may remain low until all the sensor scanning modules release SYNC to indicate that they have completed loading their respective scan configuration parameters and are ready to start to scan. Only when a rising edge is observed on SYNC to indicate that all the sensor scanning modules have reached a consensus to start the scan do all the sensor scanning modules start their scans at the same time. In one embodiment, the sensor scanning modules for multiple channel scanning of the touch sensing panel may operate in any of the CS-DMA, AS-MS, or LP-AOS modes in a time multiplexed fashion. For example, the sensor scanning modules may operate in the LP-AOS mode for some time and on specific events in the system, change to the CS-DMA or AS-MS mode. In one embodiment, the multiple sensor scanning modules may operate in any combinations of the CS-DMA, AS-MS, and LP-AOS modes in the same frame. For example, a first sensor scanning module in the multi-channel configuration may operate in the CS-DMA, a second sensor scanning module may operate in the AS-MS mode, and a third sensor scanning module may operate in the LP-AOS mode. The three sensor scanning modules may still synchronize their multiple channel scans using the consensus mechanism described.

Figure 12:
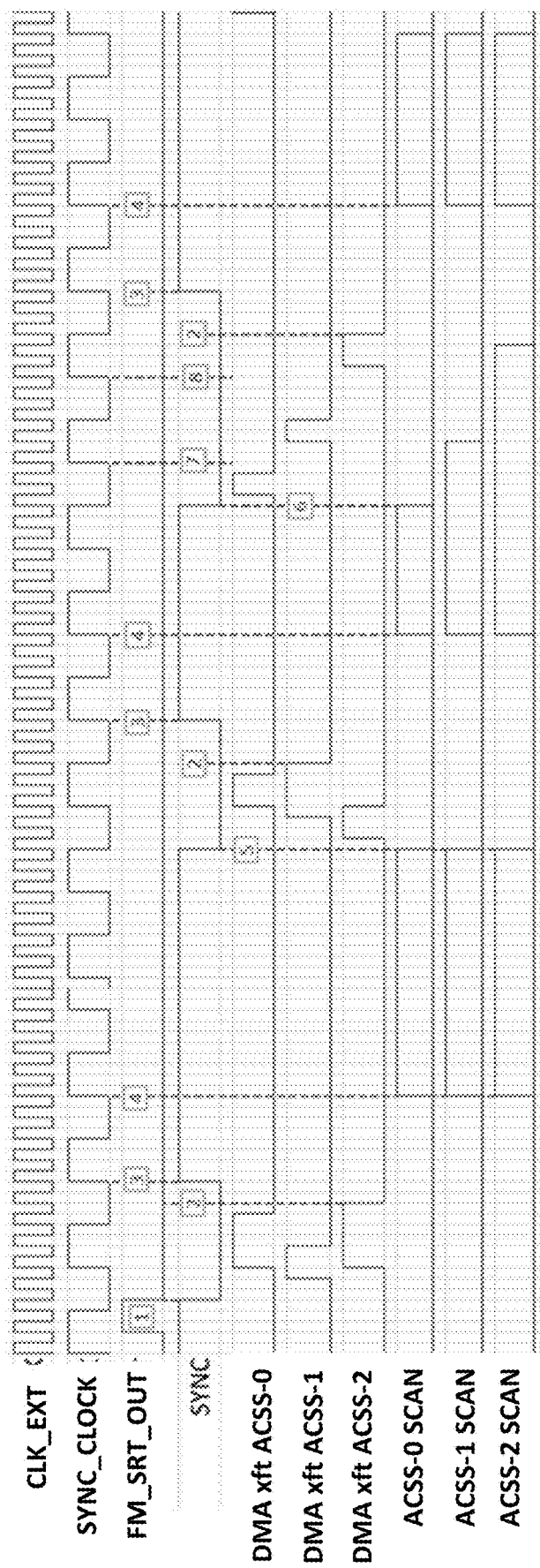
FIG. 12 illustrates a timing diagram for three sensor channels to synchronize and perform sensor scans simultaneously without requiring CPU intervention in accordance with one embodiment of the present disclosure.

FIG. 12 illustrates a timing diagram for three sensor channels to synchronize and perform sensor scans simultaneously without requiring CPU intervention in accordance with one embodiment of the present disclosure. The sensor scanning modules for the three channels are shown as operating in the CS-DMA mode.

At event 1, the CPU writes the START_FRAME bit in the base configuration register 311 of the master sensor scanning module. The master sensor scanning module generates FM_SRT_OUT to trigger the start of the frame for the two slave sensor scanning modules. All three sensor scanning modules initiate the scan configuration load operations for the first scan through their DMA channels. Each sensor scanning module may start the DMA transfer at different time and may take different amount of time to complete the DMA transfer dependent on the DMA priority and the system memory bandwidth. Each sensor scanning module drives SYNC to low to indicate the busy state when the sensor scanning module is triggered to start the frame or when initiating the scan configuration load operation. Each sensor scanning module releases SYNC when the scan configuration load operation is complete and the sensor scanning module is ready to perform scan.

At event 2, the last of the three sensor scanning modules completes its scan configuration load operation and releases SYNC. Because the other two sensor scanning modules have already released their SYNC, a rising edge is observed on SYNC.

At event 3, the rising edge of SYNC is sampled on the rising edge of SYNC_CLOCK. The sampled rising edge of SYNC indicates a consensus from all three sensor scanning modules that they are all ready to start the scan.

At event 4, all three sensor scanning modules start the scan synchronously. During the scan, SYNC remains high. When a sensor scanning module completes the scan and initiates the next scan configuration load operation through the DMA channel, the sensor scanning module drives SYNC to low to indicate the busy state.

At event 5, for the first scan, all three sensor scanning modules complete their scans at the same time. All three sensor scanning modules drive SYNC to low to reenter the busy state and initiate the scan configuration load operations for the next scan. Events 2, 3, and 4 are repeated to wait for all three sensor scanning modules to complete the scan configuration load operations for the next scan, to reach a consensus that all three sensor scanning modules are ready to start the next scan, and to start the next scan for all three channels synchronously.

At event 6, for the second scan, the sensor scanning module for channel 0 (ACSS-0) completes the scan first and initiates the next scan configuration load operation through the DMA channel. The sensor scanning module ACSS-0 drives SYNC to low to indicate the busy state. The other two sensor scanning modules may treat the falling edge of SYNC as a request for the next scan and may hold SYNC at low. The other two sensor scanning modules may not release SYNC until their current scan is completed, the scan configuration loading operation for the next scan is completed, and they are ready to start the next scan so as to prevent the sensor scanning module ACSS-0 from starting the next scan prematurely.

At event 7, the sensor scanning module ACSS-0 completes the scan configuration load operation for the next scan and releases SYNC. However, the SYNC remains at low because the other two sensor scanning modules are still performing the current scan.

At event 8, the sensor scanning module for channel 1 (ACSS-1) completes the current scan and also completes the scan configuration load operation for the next scan. The sensor scanning module ACSS-1 releases SYNC. However, the SYNC remains at low because the last sensor scanning module (ACSS-2) is still performing the current scan. A rising edge on SYNC is observed only when the sensor scanning module ACSS-2 completes its current scan and also completes the scan configuration load operation for the next scan, indicating a consensus that all three sensor scanning modules are ready to start the next scan synchronously. Advantageously, the CPU does not need to synchronize the channels and no application level interface between the sensor scanning modules is needs to start a scan or to synchronize the scans.

Figure 13:
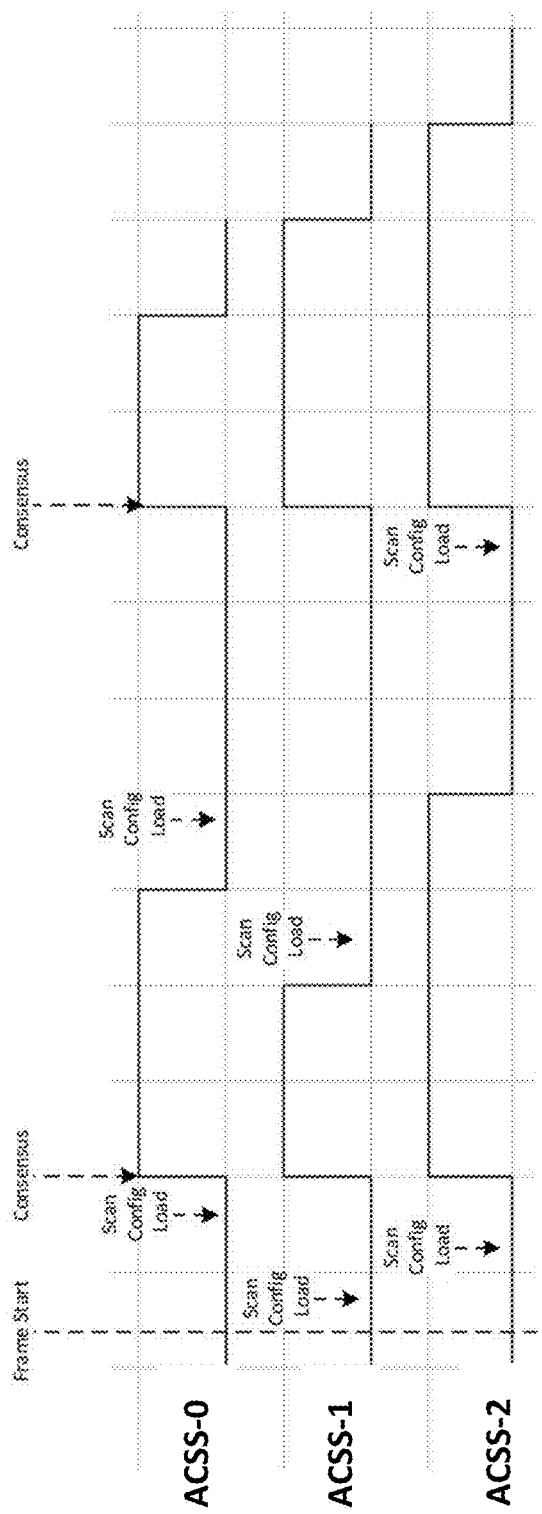
FIG. 13 illustrates a timing diagram for three sensor channels to synchronize sensor scans by waiting to reach a consensus when the sensor channels have variable timing for loading scan configuration parameters without requiring CPU intervention in accordance with one embodiment of the present disclosure.

FIG. 13 illustrates a timing diagram for three sensor channels to synchronize sensor scans by waiting to reach a consensus when the sensor channels have variable timing for loading scan configuration parameters without requiring CPU intervention in accordance with one embodiment of the present disclosure. At the start of the frame, the DMA for the three sensor channels respond with variable delays to complete the scan configuration load operations. Once all sensor channels are configured, a consensus is reached, and the sensor channels start the scans in lockstep. When a sensor channel completes its scan early, it proceeds to load the scan configuration parameters for the next scan, but waits for all other sensor channels to complete their scan and to complete loading their scan configuration parameters for the next scan. Only when the consensus is reached that all three sensor channels are ready to start their next scan are the next scans started in lockstep.

Figure 14:
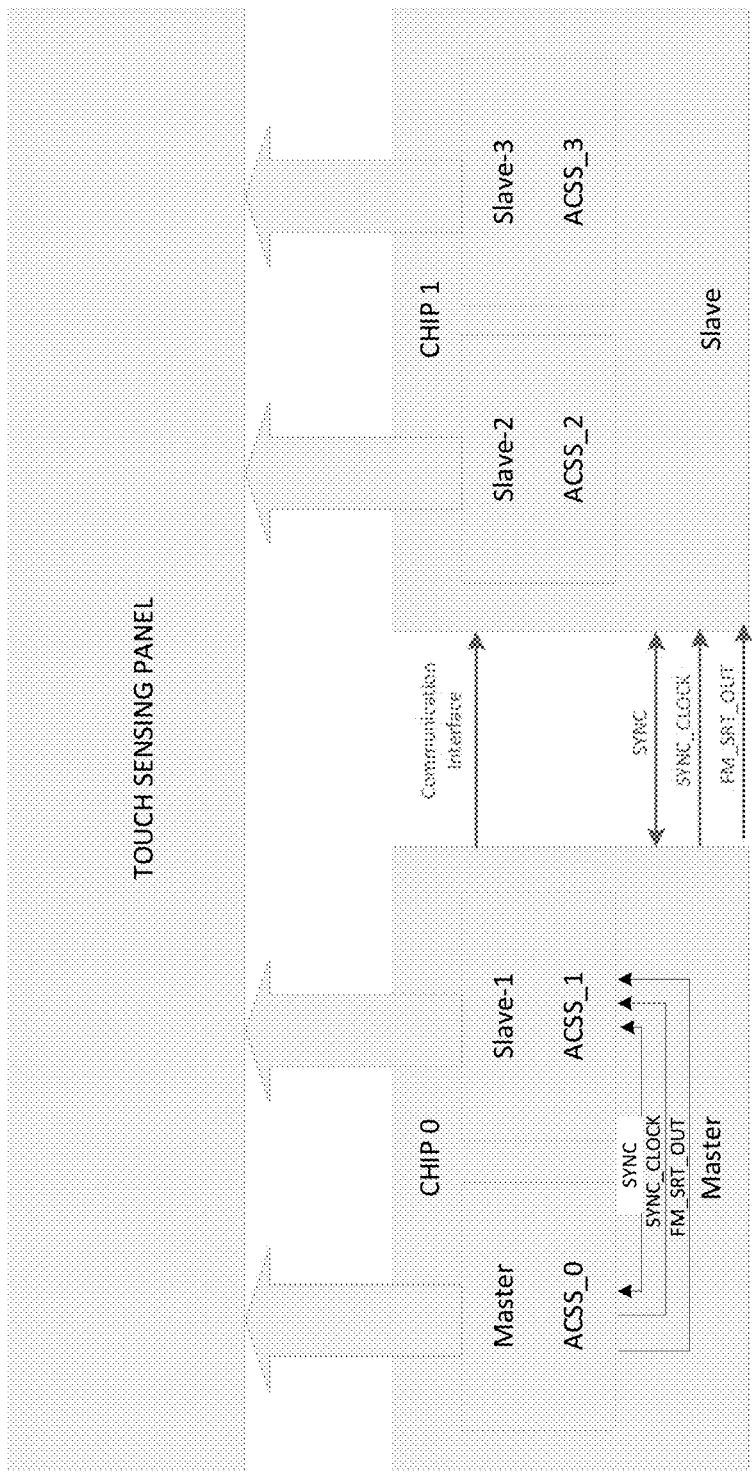
FIG. 14 illustrates an interface to synchronize two sensor chips each containing two sensor channels to perform multiple sensor scans simultaneously in accordance with one embodiment of the present disclosure.

FIG. 14 illustrates an interface to synchronize two sensor chips each containing two sensor channels to perform multiple sensor scans simultaneously in accordance with one embodiment of the present disclosure. A sensor scanning module of one sensor chip may be the master sensor scanning module (ACSS_0) that generates the sensor/Tx clock signal, e.g., SYNC_CLOCK of FIG. 11, and the frame start signal, e.g., FM_SRT_OUT of FIG. 11, to synchronize the operations of the three slave sensor scanning modules. One slave sensor scanning module (ACSS_1) resides in the same chip (CHIP_0) as the master sensor scanning module, and the remaining two slave sensor scanning modules (ACSS_2, ACSS_3) reside in the slave sensor chip (CHIP_1). The sensor/TX clock signal and the frame start signal from ACSS-0 are used to synchronize between the master sensor chip (CHIP_0) and the slave sensor chip (CHIP_1). Similarly, the sensor/Tx clock signal and the frame start signal generated by the master sensor scanning module (ACSS_0) may be used internally in the master sensor chip (CHIP_0) to synchronize between the master sensor scanning module (ACSS_0) and the slave sensor scanning module (ACSS_1) of the master sensor chip (CHIP-0). The four sensor scanning modules distributed across the two sensor chips may synchronize the start of their scans using the consensus mechanism (e.g., SYNC signal) as described for FIGS. 11, 12, and 13. Thus, with one frame trigger signal, all sensor scanning modules autonomously and synchronously complete all scans within the frame with no intervention from the CPU during the scan, regardless of whether the sensor scanning modules are in the same sensor chip or in multiple sensor chips.

Figure 15:
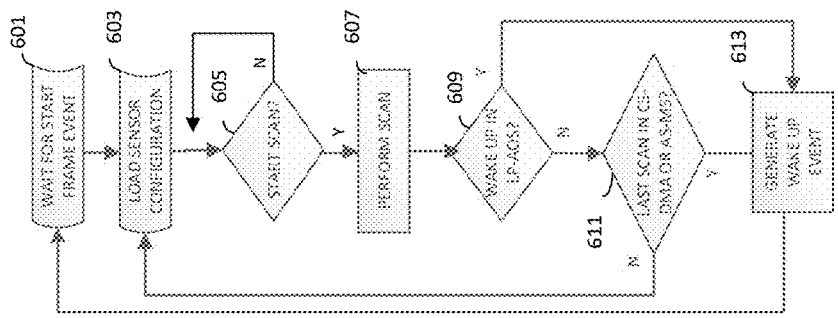
FIG. 15 illustrates a flow chart of a method to support autonomous scanning of sensors in a frame in the CS-DMA, AS-MS, or LP-AOS modes for one channel in accordance with one embodiment of the present disclosure.

FIG. 15 illustrates a flow chart of a method 600 to support autonomous scanning of sensors in a frame in the CS-DMA, AS-MS, or LP-AOS modes for one channel in accordance with one embodiment of the present disclosure. Method 600 may be practiced by the FSM of sensor scanning modules 203, 301, 401, 501 of FIGS. 2, 3, 7, 9.

At operation 601, the sensor scanning module waits for the start frame event. The sensor configuration such as the CS-DMA, AS-MS, or LP-AOS operating mode and base configuration register 311 of the sensor scanning module may be configured by a CPU before the start frame event is received. In the CS-DMA mode, the CPU may configure the DMA channel. In the AS-MS or LP-AOS mode, the CPU may program local memory 417 to store the scan configuration parameters for the sensors of one or more frames. In the LP-AOS mode, the CPU may configure the wake up condition. The CPU may trigger the start frame event by setting the START_FRAME bit. In one embodiment, the frame trigger may be provided based on an external signal, such as a GPIO, or an internal signal such as a timer expiration event.

At operation 603, the sensor scanning module loads the sensor configuration for the scan. In the CS-DMA mode, the sensor scanning module may issue a DMA write request to transfer the sensor configuration for the first sensor from the system memory to scan configuration registers 313. In the AS-MS or LP-AOS mode, the sensor scanning module may load the sensor configuration for the first sensor from local memory 417. The sensor configuration may include scan parameters, input terminal details, start scan register value such as the START_SCAN bit used to start the scan, and a pointer to the sensor configuration for the next sensor.

At operation 605, the sensor scanning module determines if a start scan command is received. The start scan command may be the START_SCAN bit written during the sensor configuration load operation after the scan parameters have been loaded from the system memory of local memory 417.

At operation, 607, if the start scan command has been received, the sensor scanning module performs the scan of the sensor in the frame using the loaded sensor configuration. A scan may involve multiple phases including fine and coarse initializations, epilogues and sub-conversions.

At operation 609, if the sensor scanning module is operating in the LP-AOS mode, the sensor scanning module processes the scanned data to determine if a wake up condition such as user interaction is detected or if programmed conditions are met. The CPU may be in a sleep mode during the operation of the frame scan during the LP-AOS mode. When the sensor scanning module detects a potentially valid user interaction or a programmed condition during the scan, the CPU may wake up the CPU from the sleep mode to further process the scanned data.

At operation 613, if a wake up condition is detected in the LP-AOS mode, the sensor scanning module generates a wake up event. In one embodiment, the sensor scanning module may generate an interrupt to wake up the CPU from the sleep mode to execute algorithms to detect user interaction such as a touch or a gesture that is beyond the detection capability of the sensor scanning module. The sensor scanning module may then return to operation 601 to wait for the next start frame event.

At operation 611, if the sensor scanning module is operating in the CS-DMA or AS-MS mode, the sensor scanning module determines if the current scan is the last scan in the frame. If the current scan is not the last scan in the frame, the sensor scanning module returns to operation 603 to load the sensor configuration for the next scan. The sensor scanning module may also return to operation 603 to load the sensor configuration for the next scan when a wake up condition is not detected in the LP-AOS mode.

At operation 613, if the current scan is the last scan in the frame in the CS-DMA or AS-MS mode, the sensor scanning module generates a wake up event. In one embodiment, the sensor scanning module may generate an interrupt for the CPU to read out and process the scanned results to determine a user interaction such as a touch or a gesture. The sensor scanning module may then return to operation 601 to wait for the next start frame event.

Figure 16:
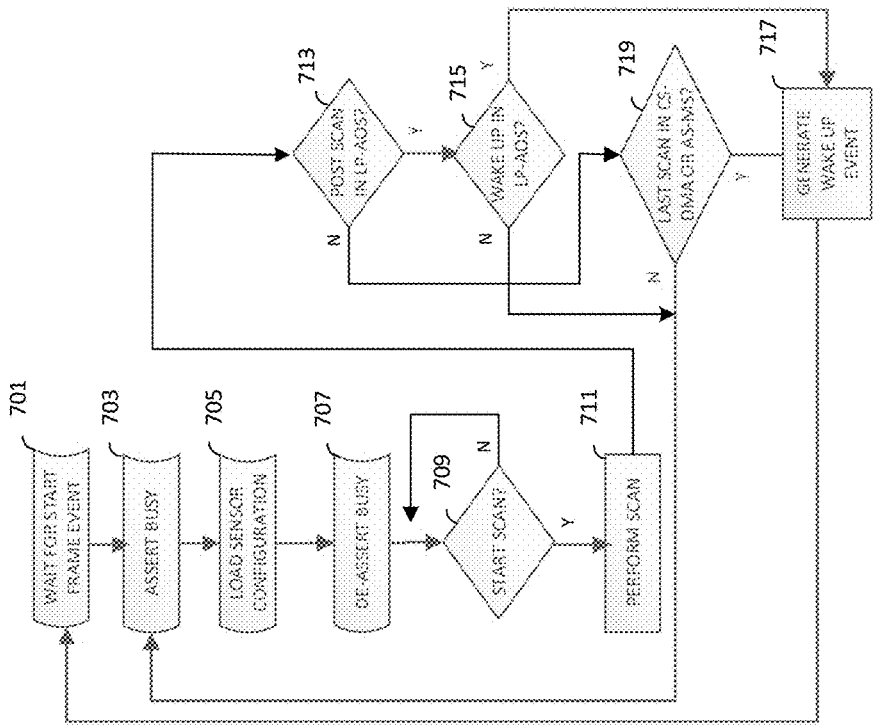
FIG. 16 illustrates a flow chart of a method to support autonomous scanning of sensors in a frame in the CS-DMA, AS-MS, or LP-AOS modes in a synchronized multiple-channel configuration in accordance with one embodiment of the present disclosure.

FIG. 16 illustrates a flow chart of a method 700 to support autonomous scanning of sensors in a frame in the CS-DMA, AS-MS, or LP-AOS modes in a synchronized multiple-channel configuration in accordance with one embodiment of the present disclosure. Method 700 may be practiced by the FSM of sensor scanning modules 203, 301, 401, 501 of FIGS. 2, 3, 7, 9 in the multi-channel or multi-chip configuration of FIGS. 11 and 14.

At operation 701, the sensor scanning module waits for the start frame event. The sensor configuration such as the CS-DMA, AS-MS, or LP-AOS operating mode and base configuration register 311 of the sensor scanning module may be configured by a CPU before the start frame event is received. In the CS-DMA mode, the CPU may configure the DMA channel. In the AS-MS or LP-AOS mode, the CPU may program local memory 417 to store the scan configuration parameters for the sensors of one or more frames. In the LP-AOS mode, the CPU may configure the wake up condition. The CPU may trigger the start frame event by setting the START_FRAME bit. In one embodiment, the frame trigger may be provided based on an external signal, such as a GPIO, or an internal signal such as a timer expiration event. In one embodiment, a slave sensor scanning module may receive the start frame event from the master sensor scanning module to synchronize the start of the frames for all the channels.

At operation 703, the sensor scanning module asserts the busy/ready status signal, such as the bidirectional SYNC signal, to indicate a busy state. In one embodiment, the sensor scanning module may drive the SYNC signal to low. A low on the SYNC signal indicates that at least one of the sensor scanning modules is busy and thus is not ready to start the scan.

At operation 705, the sensor scanning module loads the sensor configuration for the scan. In the CS-DMA mode, the sensor scanning module may issue a DMA write request to transfer the sensor configuration for the first sensor from the system memory to scan configuration registers 313. In the AS-MS or LP-AOS mode, the sensor scanning module may load the sensor configuration for the first sensor from local memory 417. The sensor configuration may include scan parameters, input terminal details, start scan register value such as the START_SCAN bit used to start the scan, and a pointer to the sensor configuration for the next sensor.

At operation 707, the sensor scanning module de-asserts the busy/ready status signal, such as releasing the bidirectional SYNC signal, to indicate that the sensor scanning module has completed loading the sensor configuration and is ready to scan. However, if there is at least one other sensor scanning module that is still loading its sensor configuration, the SYNC signal remains low. A rising edge on the SYNC signal is observed only when all the sensor scanning modules in the multi-channel or multi-chip configuration have completed their sensor configurations and have reached a consensus to start the scan.

At operation 709, the sensor scanning module determines if a start scan command is received. The start scan command may be the rising edge of the SYNC signal that indicates that all the sensor scanning modules of the channels are ready to start the scan.

At operation 711, if the start scan command is received as indicated by the rising edge of the SYNC signal, the sensor scanning module performs the scan of the sensor in the frame using the loaded sensor configuration. A scan may involve multiple phases including fine and coarse initializations, epilogues and sub-conversions.

At operation 713, if the sensor scanning module is operating in the LP-AOS mode, the sensor scanning module processes the scanned data to determine if a wake up condition such as user interaction is detected or if programmed conditions are met. The CPU may be in a sleep mode during the operation of the frame scan during the LP-AOS mode. When the sensor scanning module detects a potentially valid user interaction or a programmed condition during the scan, the CPU may wake up the CPU from the sleep mode to further process the scanned data.

At operation 715, if a wake up condition is detected in the LP-AOS mode, the sensor scanning module generates a wake up event in operation 717. In one embodiment, the sensor scanning module may generate an interrupt to wake up the CPU from the sleep mode to execute algorithms to detect user interaction such as a touch or a gesture that is beyond the detection capability of the sensor scanning module. The sensor scanning module may then return to operation 701 to wait for the next start frame event. If a wake up condition is not detected in the LP-AOS mode, the sensor scanning module returns to operation 703 to assert the busy/ready status signal to indicate a busy state and to load the sensor configuration for the next scan.

In operation 719, if the sensor scanning module is operating in the CS-DMA or AS-MS mode, the sensor scanning module determines if the current scan is the last scan in the frame. If the current scan is not the last scan in the frame, the sensor scanning module returns to operation 703 to asserts the busy/ready status signal to indicate a busy state and to load the sensor configuration for the next scan.

In operation 717, if the current scan is the last scan in the frame in the CS-DMA or AS-MS mode, the sensor scanning module generates a wake up event. In one embodiment, the sensor scanning module may generate an interrupt for the CPU to read out and process the scanned results to determine a user interaction such as a touch or a gesture. The sensor scanning module may then return to operation 701 to wait for the next start frame event.

Figure 17:
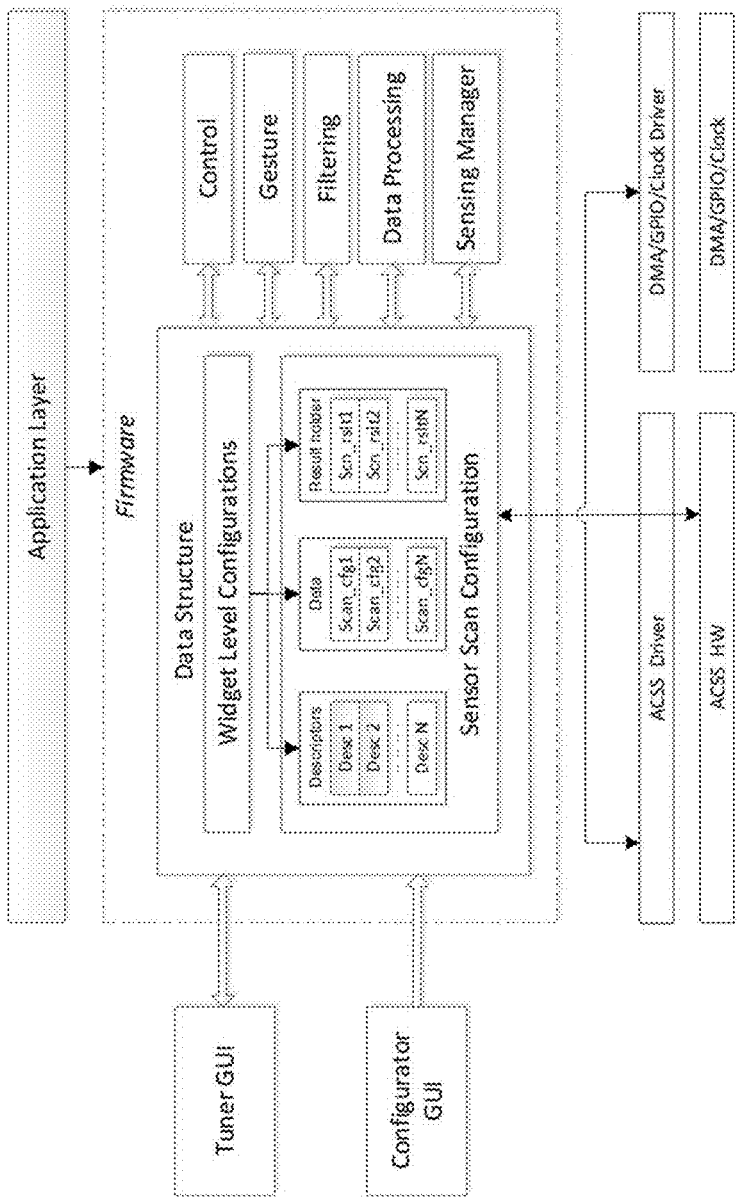
FIG. 17 illustrates a firmware architecture and a data structure to support a sensor module that performs autonomous sensor scans in a frame using the CS-DMA mode in accordance with one embodiment of the present disclosure.

FIG. 17 illustrates a firmware architecture and a data structure to support a sensor module that performs autonomous sensor scans in a frame using the CS-DMA mode in accordance with one embodiment of the present disclosure.

The "Sensing module" implements interrupt driven and CPU bandwidth hungry sensor scanning operation and rest of the modules implements specific data processing algorithms on sensor scan data to detect various user interactions such as touches and gestures.

Figure 18:
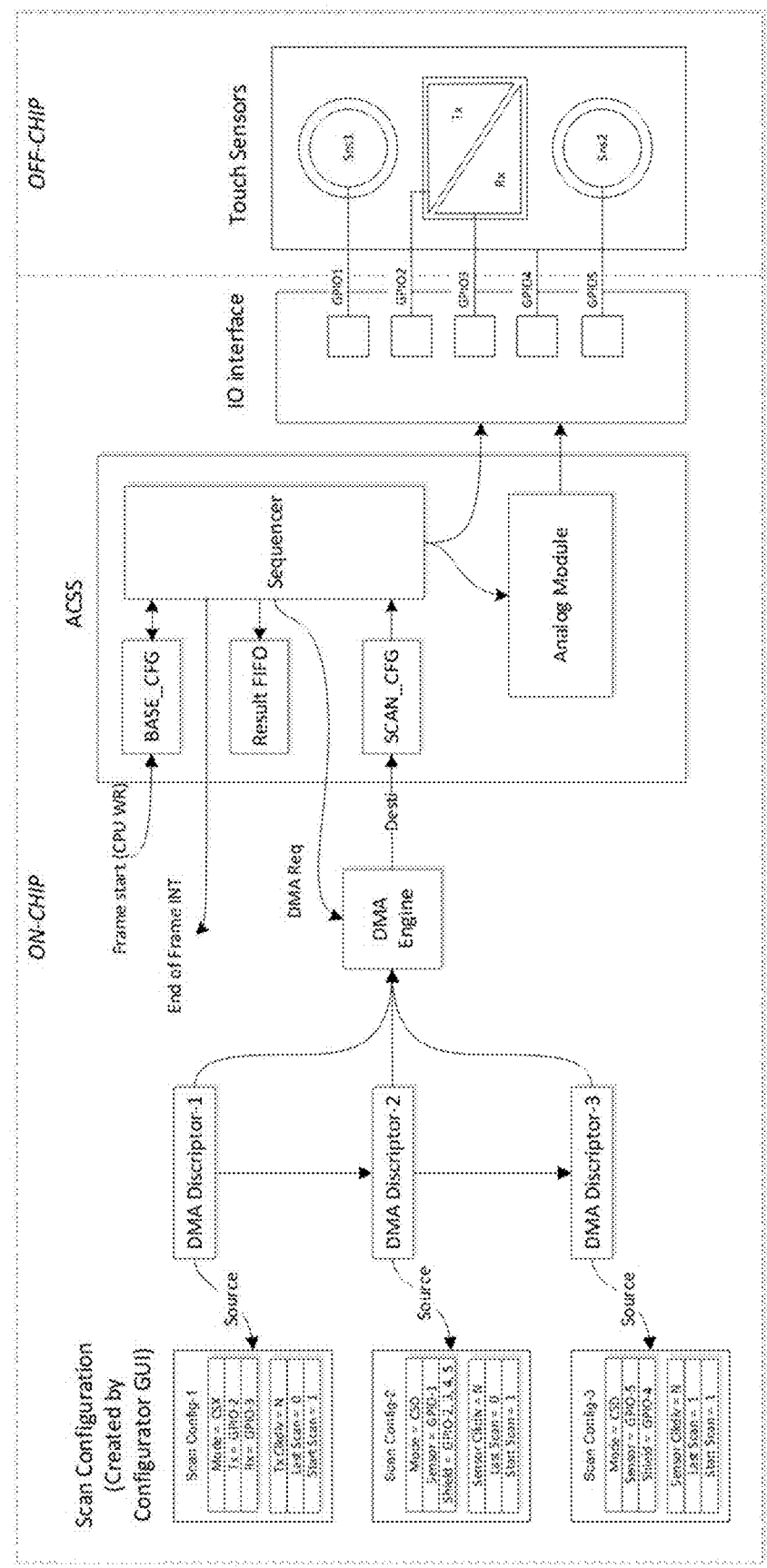
FIG. 18 illustrates hardware-firmware interaction and data flow to load scan configuration from a data structure into the sensor module to perform sensor scans in a frame using the CS-DMA mode in accordance with one embodiment of the present disclosure.

FIG. 18 illustrates hardware-firmware interaction and data flow to load scan configuration from a data structure into the sensor module to perform sensor scans in a frame using the CS-DMA mode in accordance with one embodiment of the present disclosure.

An array of scan configuration data structure contains hardware related parameters for each sensor scan in the frame. The information in each configuration includes details such as sensing mode (CSX, CSD, or ISX), GPIOs associated with sensor, information such as resolution, sensor clock etc. The last register contains information indicating whether it is last scan in the frame or not and a "scan start" control bit.

Each scan configuration data structure element has an associated DMA descriptor specifying address of scan configuration data structure (data source) and SCAN_CFG register address (data destination) and other DMA configuration information. Note that each descriptor points to next descriptor (linked-list) for next DMA transfer. To perform a frame of scan, firmware writes "Frame start" bit in register. The sequencer then issues a DMA request based on which first sensor-1 scan configuration is copied to SCAN_CFG registers by DMA. The sequencer starts the scan related operation only after "start scan" bit (last register) is written, i.e. after data transfer is complete. The sequencer performs sensor scan based on configuration loaded. At the end of sensor scan, result is pushed into result FIFO and DMA request to load next sensor scan configuration is issued only if "last scan" bit is cleared in current scan configuration. Sensor scans may be repeated for different scan configuration. At end of the last scan, the scan configuration indicates last scan in the frame hence the sequencer issues an "end of frame" interrupt with DMA request for next scan configuration write. CPU may copy scan results from FIFO to data structure for further data processing. In one embodiment, another DMA transfer (FIFO to Memory) can be used at end of each scan or when FIFO is full to transfer the data.

Figure 19:
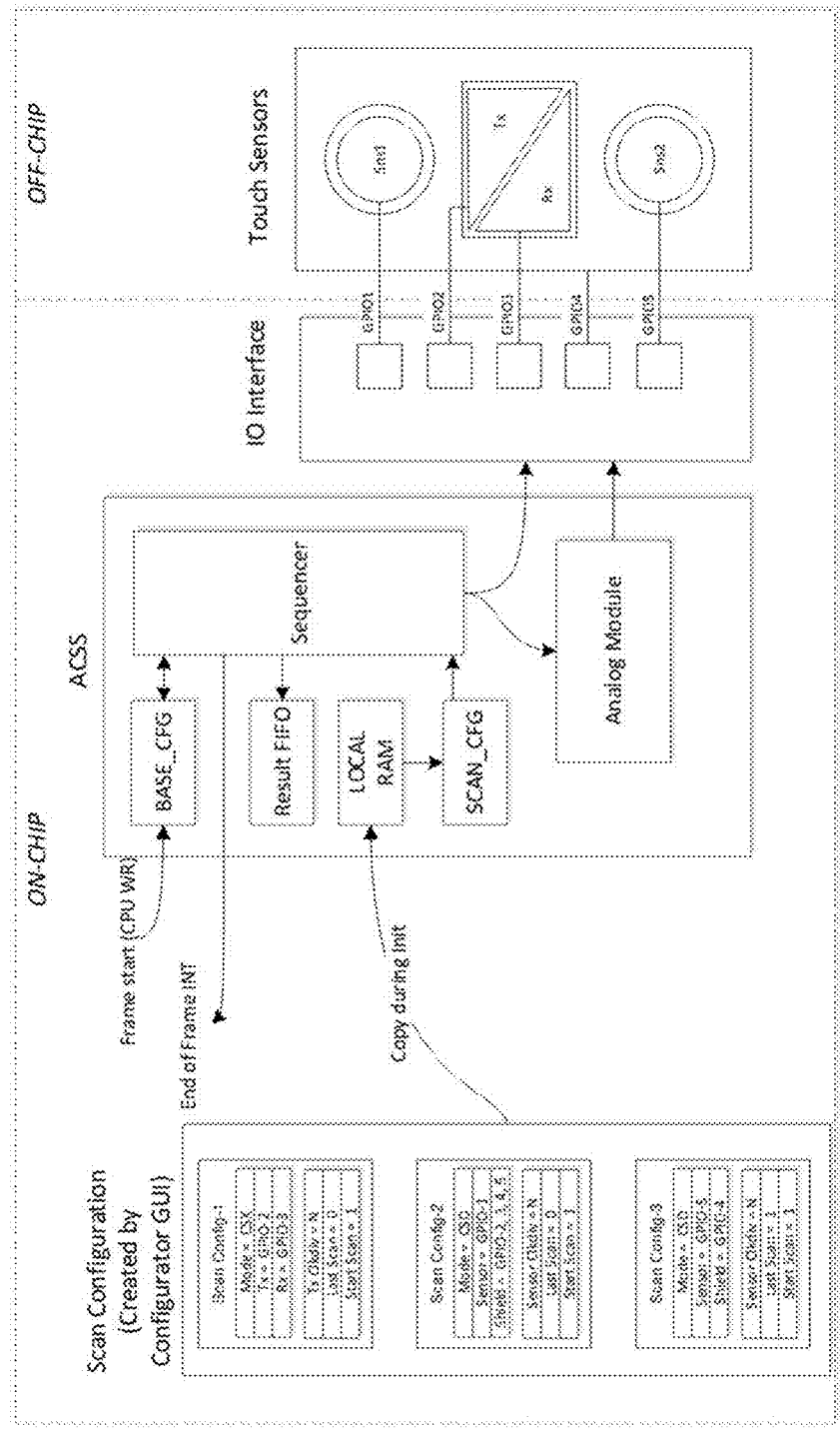
FIG. 19 illustrates hardware-firmware interaction and data flow to copy scan configuration data structure into a local RAM of the sensor module to perform sensor scans in a frame using the AS-MS mode in accordance with one embodiment of the present disclosure.

FIG. 19 illustrates hardware-firmware interaction and data flow to copy scan configuration data structure into a local RAM of the sensor module to perform sensor scans in a frame using the AS-MS mode in accordance with one embodiment of the present disclosure.

The scan operation is like CS-DMA mode scan except configuration is transferred between a local RAM and SCAN_CFG by sequencer without using DMA. To perform a frame of scan, firmware writes "Frame start" bit in configuration register. The sequencer then copies the sensor-1 scan configuration into SCAN_CFG registers. The sequencer starts the scan related operation only after "start scan" bit (last register) is written, i.e. after data transfer is complete. The sequencer performs scan based on configuration loaded. At the end of scan, scan result is pushed into result FIFO and sequencer loads next scan configuration only if "last scan" bit is cleared in current scan configuration. After the last scan the sequencer pushes result into FIFO, issues an "end of frame" interrupt and ends the frame. The CPU copies scan results from FIFO to data structure for further data processing In one embodiment, the sensor scanning module 203, 301, 401, 501 of FIGS. 2, 3, 7, 9 may include a memory and a processing device (not shown). The memory may be synchronous dynamic random access memory (DRAM), read-only memory (ROM)), or other types of memory, which may be configured to store the code to perform the function of a WLAN driver. The processing device may be provided by one or more general-purpose processing devices such as a microprocessor, central processing unit, or the like. In an illustrative example, processing device may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device may also comprise one or more special-purpose processing devices such as an application specific integrated circuit (ASIC), a field programmable gate array (FPGA), a digital signal processor (DSP), network processor, or the like. The processing device may be configured to execute the operations described herein, in accordance with one or more aspects of the present disclosure, to perform autonomous scanning of sensors in a frame in a single channel or a multi-channel configuration.

Unless specifically stated otherwise, terms such as "receiving," "generating," "verifying," "performing," "correcting," "identifying," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

Certain embodiments may be implemented as a computer program product that may include instructions stored on a machine-readable medium. These instructions may be used to program a general-purpose or special-purpose processor to perform the described operations. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions. The machine-readable medium may be referred to as a non-transitory machine-readable medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Also, the terms "first," "second," "third," "fourth," etc., as used herein are meant as labels to distinguish among different elements and may not necessarily have an ordinal meaning according to their numerical designation. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/ component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. For example, while embodiments of the subject technology are described using capacitive sensors of a touch screen panel, the subject technology is not thus limited and may be applicable to other types of sensor technologies or sensor applications using other types of sensors such as inductive, magnetic, current, voltage sensors. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A capacitive sensing device, comprising:
a processor;
an autonomous capacitive sensing subsystem (ACSS) configured to:
receive a start frame event;
load, without intervention by the processor, a first sensor configuration of a plurality of sensor configurations stored in a system memory for a first scan of a capacitive touch interface in a frame that includes a plurality of scans when the start frame event is received;
perform the first scan of the capacitive touch interface using the first sensor configuration to receive sensor data independently of a state of the processor;
determine if there is an additional scan of the frame to be performed;
load, without intervention by the processor, a next sensor configuration of the plurality of sensor configurations stored in the system memory for a next scan of the frame and perform the next scan of the capacitive touch interface using the next sensor configuration independently of the state of the processor in response to a determination of an additional scan of the frame to be performed; and
signal the processor to process the sensor data in response to a determination that there is no additional scan of the frame to be performed.

2. The capacitive sensing device of claim 1, wherein the ACSS is configured to repeatedly load, without intervention by the processor, the next sensor configuration for the next scan of the frame and to perform repeatedly the next scan using the next sensor configuration until there is no more scan of the frame to be performed.

3. The capacitive sensing device of claim 1, wherein to load, without intervention by the processor, the first sensor configuration or the next sensor configuration, the ACSS is configured to load the first sensor configuration or the next sensor configuration through a direct memory access (DMA) channel from the system memory.

4. The capacitive sensing device of claim 3, wherein the ACSS is further configured to transfer the sensor data through the DMA channel to the system memory after the first scan or the next scan of the frame for the processor to process the sensor data when the processor is interrupted.

5. The capacitive sensing device of claim 1, wherein the ACSS comprises a local memory configured, prior to the start frame event, by the processor to store sensor configuration for the plurality of scans of the frame, and wherein to load, without intervention by the processor, the first sensor configuration or the next sensor configuration, the ACSS is configured to load the first sensor configuration or the next sensor configuration from the local memory.

6. The capacitive sensing device of claim 1, wherein the ACSS is further configured to:
process the sensor data to determine if a wake up condition is satisfied; and
signal the processor to process the sensor data to determine an interaction on the capacitive touch interface in response to the wake up condition.

7. The capacitive sensing device of claim 6, wherein the processor is in a low power mode when the ACSS is configured to perform the first scan or the next scan of the frame, and wherein the processor is awakened from the low power mode when the processor is interrupted by the ACSS to process the sensor data.

8. The capacitive sensing device of claim 1, wherein the ACSS is one of a plurality of sensing subsystems configured to simultaneously scan the capacitive touch interface, and wherein the ACSS is further configured to perform the first scan or the next scan of the frame synchronously with the plurality of sensing subsystems.

9. The capacitive sensing device of claim 8, wherein to perform the first scan or the next scan of the frame synchronously with the plurality of sensing subsystems, the ACSS is configured to:
synchronize a start of the frame for the ACSS and for the plurality of sensing subsystems in response to the start frame event;
assert a busy signal when the ACSS loads the first sensor configuration or the next sensor configuration;
de-assert the busy signal when the first sensor configuration or the next sensor configuration is loaded; and
wait for the busy signal to indicate a consensus that all of the plurality of sensing subsystems are ready before the ACSS is configured to start the first scan or the next scan of the frame for the ACSS in synchronization with a start of the first scan or the next scan of the frame for the plurality of sensing subsystems.

10. The capacitive sensing device of claim 9, wherein to synchronize a start of the frame for the ACSS and for the plurality of sensing subsystems, the ACSS is configured to:
receive the start frame event from the processor as a master subsystem;
generate a frame start signal in response to the start frame event; and
distribute the frame start signal to the plurality of sensing subsystems to synchronize the start of the frame for the plurality of sensing subsystems as slave subsystems to the start of the frame of the ACSS as the master subsystem.

11. A method of operating an autonomous capacitive sensing subsystem (ACSS) of a capacitive sensing device, comprising:
receiving, by the ACSS, a start frame event;
loading, by the ACSS without intervention by a processor of the capacitive sensing device, a first sensor configuration of a plurality of sensor configurations stored in a system memory for a first scan of a capacitive touch interface in a frame that includes a plurality of scans upon receiving the start frame event;
performing, by the ACSS, the first scan of the capacitive touch interface using the first sensor configuration to receive sensor data independently of a state of the processor;
determining, by the ACSS, if there is an additional scan of the frame to be performed;
loading, by the ACSS without intervention by the processor, a next sensor configuration of the plurality of sensor configurations stored in the system memory for a next scan of the frame and performing the next scan of the capacitive touch interface using the next sensor configuration independently of the state of the processor in response to determining an additional scan of the frame to be performed; and
signaling, by the ACSS, to the processor to process the sensor data in response to determining that there is no additional scan of the frame to be performed.

12. The method of claim 11, further comprising:
repeatedly loading, by the ACSS without intervention by the processor, the next sensor configuration for the next scan of the frame and performing repeatedly the next scan using the next sensor configuration until there is no more scan of the frame to be performed.

13. The method of claim 11, wherein loading, by the ACSS without intervention by the processor, a first sensor configuration or the next sensor configuration comprises:
loading, by the ACSS, the first sensor configuration or the next sensor configuration through a direct memory access (DMA) channel from the system memory.

14. The method of claim 13, further comprising:
transferring, by the ACSS, the sensor data through the DMA channel to the system memory after the first scan or the next scan of the frame for the processor to process the sensor data when the processor is interrupted.

15. The method of claim 11, further comprising:
storing, by the ACSS, sensor configuration for the plurality of scans of the frame in a local memory prior to the start frame event,
and wherein loading, by the ACSS without intervention by the processor, a first sensor configuration or the next sensor configuration comprises:
loading, by the ACSS, the first sensor configuration or the next sensor configuration from the local memory.

16. The method of claim 11, further comprising:
processing, by the ACSS, the sensor data to determine if a wake up condition is satisfied; and
signaling, by the ACSS, to the processor to process the sensor data to determine an interaction on the capacitive touch interface in response to the wake up condition.

17. The method of claim 11, wherein the ACSS is one of a plurality of sensing subsystems configured to simultaneously scan the capacitive touch interface, the method further comprising:
performing, by the ACSS, the first scan or the next scan of the frame synchronously with the plurality of sensing subsystems.

18. The method of claim 17, wherein performing, by the ACSS, the first scan or the next scan of the frame synchronously with the plurality of sensing subsystems comprise:
synchronizing a start of the frame for the ACSS and for the plurality of sensing subsystems in response to the start frame event;
asserting, by the ACSS, a busy signal when loading the first sensor configuration or the next sensor configuration;
de-asserting, by the ACSS, the busy signal when the first sensor configuration or the next sensor configuration is loaded; and
waiting, by the ACSS, for the busy signal to indicate a consensus that all of the plurality of sensing subsystems are ready before starting to perform the first scan or the next scan of the frame for the ACSS in synchronization with starting to perform the first scan or the next scan of the frame for the plurality of sensing subsystems.

19. The method of claim 18, wherein synchronizing a start of the frame for the ACSS and for the plurality of sensing subsystems comprises:
receiving, by the ACSS, the start frame event from the processor as a master subsystem;
generating a frame start signal in response to the start frame event; and
distributing the frame start signal to the plurality of sensing subsystems to synchronize the start of the frame for the plurality of sensing subsystems as slave subsystems to the start of the frame of the ACSS as the master subsystem.

20. A capacitive sensing system, comprising:
a processor;
a system memory configured to be accessed by the processor, the system memory storing a plurality of sensor configurations;
a capacitive touch interface that includes a plurality of capacitive sensors;
an autonomous capacitive sensing subsystem (ACSS) configured to:
receive a start frame event;
load, without intervention by the processor, a first sensor configuration of the plurality of sensor configurations stored in the system memory for a first scan of the capacitive touch interface in a frame that includes a plurality of scans when the start frame event is received;
perform the first scan of the plurality of capacitive sensors of the capacitive touch interface using the first sensor configuration to receive sensor data independently of a state of the processor;
determine if there is an additional scan of the frame to be performed;

load, without intervention by the processor, a next sensor configuration of the plurality of sensor configurations stored in the system memory for a next scan of the frame and perform the next scan of the plurality of capacitive sensors of the capacitive touch interface using the next sensor configuration independently of the state of the processor in response to a determination of an additional scan of the frame to be performed; and signal the processor to process the sensor data in response to a determination that there is no additional scan of the frame to be performed.

\* \* \* \* \*